(12) United States Patent
Michikoshi et al.

(10) Patent No.: US 10,543,845 B2
(45) Date of Patent: Jan. 28, 2020

(54) CONTROL DEVICE FOR VEHICLE

(71) Applicant: TOYOTA JIDOSHA KABUSHIKI KAISHA, Toyota-shi (JP)

(72) Inventors: Yosuke Michikoshi, Toyota (JP); Masashi Ikemura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 9 days.

(21) Appl. No.: 15/980,798

(22) Filed: May 16, 2018

(65) Prior Publication Data
US 2018/0334171 A1 Nov. 22, 2018

(30) Foreign Application Priority Data
May 19, 2017 (JP) ................................. 2017-100348

(51) Int. Cl.
*B60W 30/20* (2006.01)
*B60W 10/02* (2006.01)
(Continued)

(52) U.S. Cl.
CPC .......... *B60W 30/20* (2013.01); *B60W 10/026* (2013.01); *B60W 10/11* (2013.01); *B60W 30/1843* (2013.01); *F16H 61/0202* (2013.01); *F16H 61/143* (2013.01); *B60W 2030/203* (2013.01); *B60W 2510/0233* (2013.01); *B60W 2510/0241* (2013.01); *B60W 2510/0291* (2013.01); *B60W 2510/0638* (2013.01); *B60W 2710/024* (2013.01);
(Continued)

(58) Field of Classification Search
CPC ............... B60W 10/026; B60W 10/11; B60W 30/1843; B60W 30/20; F16H 2059/725; F16H 61/0202; F16H 61/143
See application file for complete search history.

(56) References Cited

U.S. PATENT DOCUMENTS 5,704,871 A   1/1998  Furukawa et al.
9,050,963 B2 * 6/2015  Dodo ...................... F16D 48/08
(Continued)

FOREIGN PATENT DOCUMENTS

CN        1550697 A    12/2004
CN      103797282 B    11/2015
(Continued)

*Primary Examiner* — Edwin A Young
(74) *Attorney, Agent, or Firm* — Oblon, McClelland, Maier & Neustadt, L.L.P.

(57) ABSTRACT

A control device for a vehicle includes an electronic control unit configured to control release of a predetermined engaging device configured to selectively engage a rotating member of a loaded part that participates in power transmission in a predetermined gear stage among a plurality of engaging devices with a rotating member of a non-loaded part that does not participate in the power transmission in the predetermined gear stage, at the time of selection of the predetermined gear stage of a stepped transmission, and control the predetermined engaging device such that an engagement pressure for bringing the predetermined engaging device into a weak slip state in a range that does not affect the selection of the predetermined gear stage is added, at the time of the selection of the predetermined gear stage and in a predetermined operational state.

7 Claims, 11 Drawing Sheets

(51) Int. Cl.
*B60W 10/11* (2012.01)
*B60W 30/184* (2012.01)
*F16H 61/14* (2006.01)
*F16H 61/02* (2006.01)
*F16H 57/00* (2012.01)
*F16H 61/686* (2006.01)
*F16H 59/72* (2006.01)
*F16H 3/66* (2006.01)
*F16H 59/68* (2006.01)
*F16H 57/08* (2006.01)
*F16H 57/10* (2006.01)

(52) U.S. Cl.
CPC ..... *B60W 2710/1005* (2013.01); *F16H 3/663* (2013.01); *F16H 3/666* (2013.01); *F16H 57/10* (2013.01); *F16H 61/686* (2013.01); *F16H 2057/0012* (2013.01); *F16H 2057/087* (2013.01); *F16H 2059/6815* (2013.01); *F16H 2059/725* (2013.01); *F16H 2200/006* (2013.01); *F16H 2200/2007* (2013.01); *F16H 2200/2023* (2013.01); *F16H 2200/2046* (2013.01); *F16H 2200/2097* (2013.01)

(56) References Cited

U.S. PATENT DOCUMENTS

| | | |
|---|---|---|
| 2004/0157705 A1 | 8/2004 | Nobumoto et al. |
| 2010/0174429 A1* | 7/2010 | Hase .............. B60K 6/48 701/22 |
| 2014/0209425 A1 | 7/2014 | Tsutsui et al. |
| 2015/0191174 A1* | 7/2015 | Ishikawa .......... F02D 41/022 477/54 |
| 2016/0131256 A1 | 5/2016 | Toyoda et al. |

FOREIGN PATENT DOCUMENTS

| | | |
|---|---|---|
| DE | 10 2013 011 559 A1 | 6/2014 |
| JP | 2009-255618 | 11/2009 |
| JP | 2010-270861 | 12/2010 |
| JP | 5447739 | 3/2014 |
| JP | 2016-211686 | 12/2016 |

* cited by examiner

FIG. 4

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT    BLANK: RELEASE

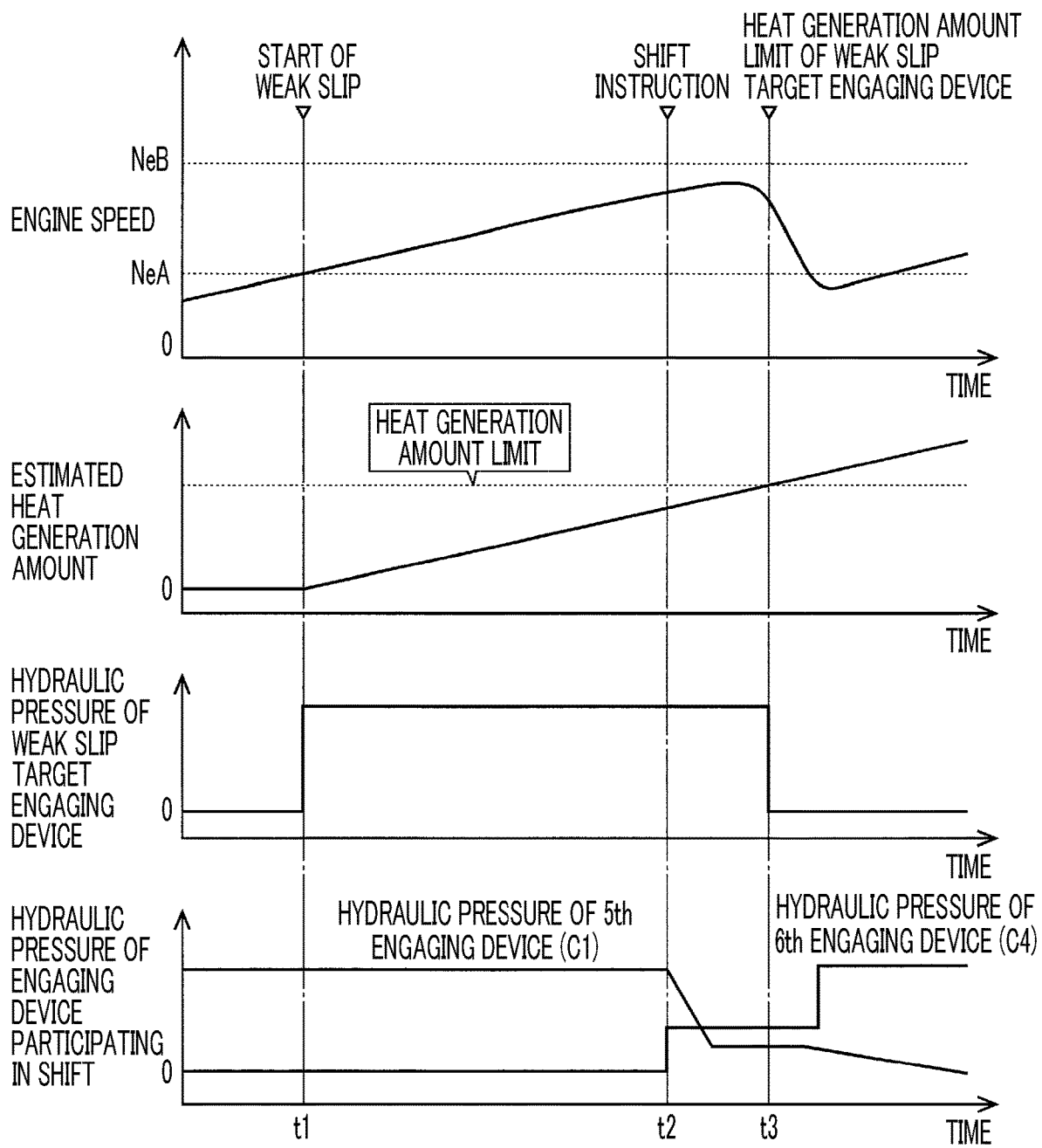

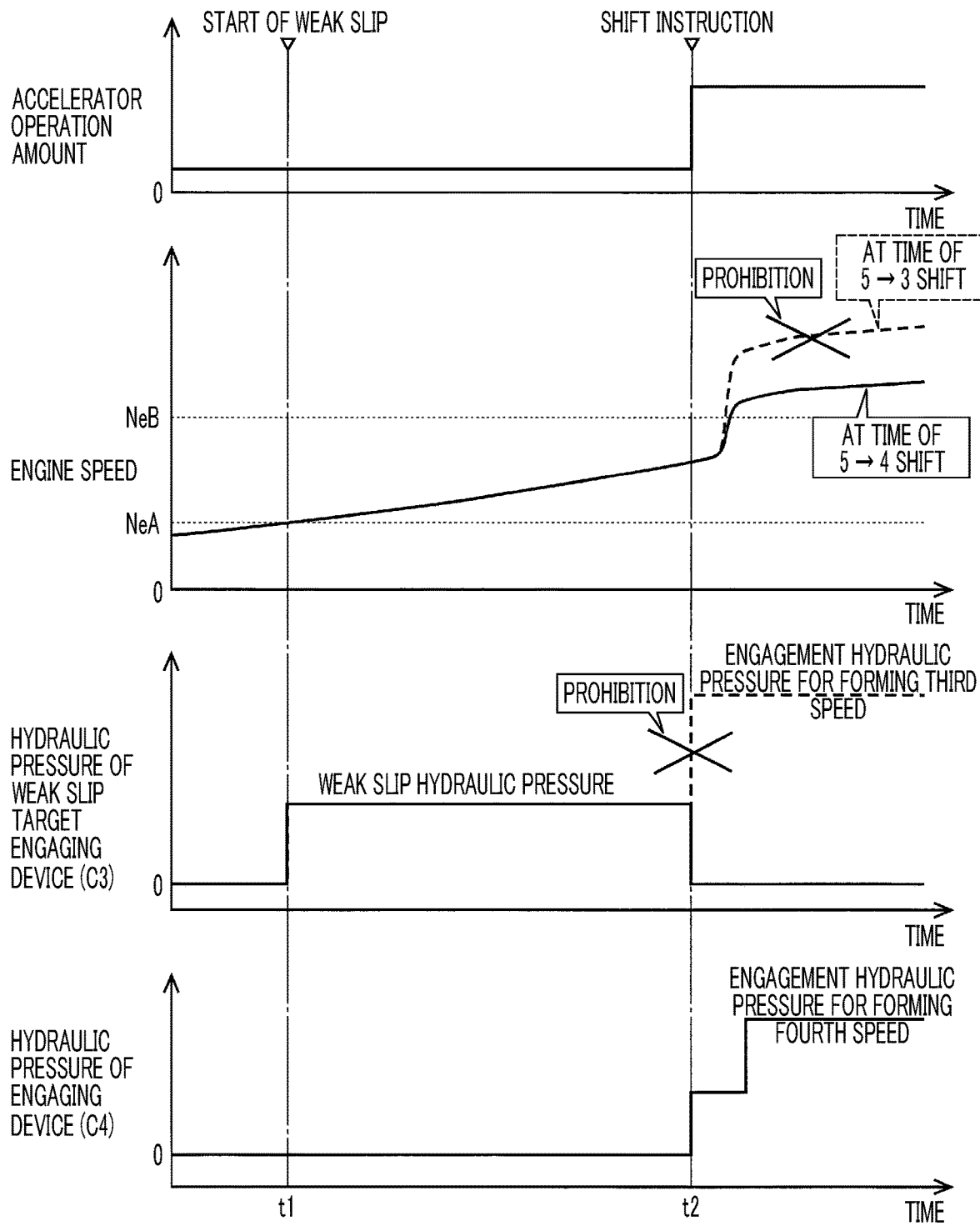

CONTROL DEVICE FOR VEHICLE

INCORPORATION BY REFERENCE

The disclosure of Japanese Patent Application No. 2017-100348 filed on May 19, 2017 including the specification, drawings and abstract is incorporated herein by reference in its entirety.

BACKGROUND

1. Technical Field

The present disclosure relates to a control device for a vehicle including an engine, a hydraulic power transmission device having a lock-up clutch, and a stepped transmission.

2. Description of Related Art

Control devices for a vehicle including an engine, a hydraulic power transmission device that is provided on a power transmission path between the engine and drive wheels and has a lock-up clutch, and a stepped transmission that is provided on the power transmission path and in which one gear stage of a plurality of gear stages is selected by any of a plurality of engaging devices being selectively engaged are well known. For example, a vehicular power transmission device is described in Japanese Unexamined Patent Application Publication No. 2016-211686 (JP 2016-211686 A). JP 2016-211686 A discloses improving fuel efficiency by engagement of a lock-up clutch.

SUMMARY

Meanwhile, in the vehicle as mentioned above, when the lock-up clutch is engaged (also synonymous with being locked up in the case of the lock-up clutch), vibration (also referred to as explosive vibration of the engine) caused by explosion in the engine is directly transmitted to the power transmission path, and in-vehicle muffled sound (simply also referred to as muffled sound) is likely to be generated. A region where the muffled sound as mentioned above is likely to be generated is, for example, a region where the explosive vibration of the engine is relatively large like a low rotational speed region of the engine, and is defined as a region (also referred to as a lock-up off region) where the lock-up clutch is released. That is, a region (also referred to as a lock-up region) where the lock-up clutch can be engaged, avoiding the region where the muffled sound is generated, is defined. From another viewpoint, in the stepped transmission as mentioned above, in each gear stage, a non-loaded part that is a part that does not participate in power transmission is separated from a loaded part that is a part that participates in the power transmission. The rotational inertia (also referred to as non-loaded part inertia) of the non-loaded part tends to increase as the number of stages of the stepped transmission increases. When the non-loaded part inertia increases, that is, when the rotational inertia (also referred to as the loaded part inertia) of the loaded part decrease, the explosive vibration of the engine is not easily damped. Therefore, this may lead to aggravation of the muffled sound, and a narrowing in the lock-up region may be caused. For that reason, it is desired to avoid the generation of the muffled sound to enlarge the lock-up region.

The present disclosure provides a control device for a vehicle capable of enlarging a lock-up region to improve fuel efficiency.

An aspect of the present disclosure relates to a control device for a vehicle. The vehicle includes an engine, a hydraulic power transmission device disposed on a power transmission path between the engine and drive wheels, and a stepped transmission disposed on the power transmission path. The hydraulic power transmission device includes a lock-up clutch. The stepped transmission is configured such that one gear stage of a plurality of gear stages is selected by any of a plurality of engaging devices being selectively engaged. The control device includes an electronic control unit configured to control release of a predetermined engaging device configured to selectively engage a rotating member of a loaded part that participates in power transmission in a predetermined gear stage with a rotating member of a non-loaded part that does not participate in the power transmission in the predetermined gear stage, among the engaging devices, at the time of selection of the predetermined gear stage of the stepped transmission, and control the predetermined engaging device such that an engagement pressure for bringing the predetermined engaging device into a weak slip state in a range that does not affect the selection of the predetermined gear stage is added, at the time of the selection of the predetermined gear stage and in a predetermined operational state.

In the control device for a vehicle according to the aspect of the present disclosure, the predetermined operational state may be in a predetermined rotational speed region of the engine where explosive vibration of the engine decreases as an engine speed of the engine increases, and muffled sound accompanying engagement of the lock-up clutch is likely to be generated.

In the control device for a vehicle according to the aspect of the present disclosure, the electronic control unit may be configured to determine whether or not a heat generation amount of the predetermined engaging device brought into the weak slip state becomes equal to or greater than a predetermined heat generation amount, and the electronic control unit may be configured to control the predetermined engaging device such that the weak slip state is released, in a case where the heat generation amount of the predetermined engaging device becomes equal to or greater than the predetermined heat generation amount.

In the control device for a vehicle according to the aspect of the present disclosure, the electronic control unit may be configured to determine that the heat generation amount of the predetermined engaging device becomes equal to or greater than the predetermined heat generation amount, in a case where the predetermined engaging device is brought into the weak slip state for a predetermined time or longer.

In the control device for a vehicle according to the aspect of the present disclosure, the electronic control unit may be configured to control engaging of the lock-up clutch when the predetermined engaging device is brought into the weak slip state in the predetermined operational state, and the electronic control unit may be configured to control release of the engagement of the lock-up clutch, in a case where the heat generation amount of the predetermined engaging device becomes equal to or greater than the predetermined heat generation amount.

In the control device for a vehicle according to the aspect of the present disclosure, the electronic control unit may be configured to control engaging of the lock-up clutch when the predetermined engaging device is brought into the weak slip state in the predetermined operational state, the electronic control unit may be configured to execute shift of the stepped transmission, in a case where the heat generation amount of the predetermined engaging device becomes equal to or greater than the predetermined heat generation amount, and the electronic control unit may be configured to control the continuation of the engagement of the lock-up clutch, in a case where the shift of the stepped transmission is executed when the heat generation amount of the predetermined engaging device becomes equal to or greater than the predetermined heat generation amount.

In the control device for a vehicle according to the aspect of the present disclosure, the electronic control unit may be configured to prohibit shift of the stepped transmission to a gear stage selected by the engagement of the predetermined engaging device, in a case where the shift of the stepped transmission is needed when the predetermined engaging device is brought into the weak slip state.

According to the aspect of the present disclosure, in the predetermined operational state, the engagement pressure is added to the predetermined engaging device capable of mutually coupling the rotating member of the loaded part and the rotating member of the non-loaded part that rotate relative to each other such that the predetermined engaging device is brought into the weak slip state within a range that does not affect the selection of the predetermined gear stage. Thus, drag torque in the predetermined engaging device is increased, non-loaded part inertia is pressed in a counter-torque direction of clearance in a rotational direction of a coupling part between the non-loaded part and the loaded part coupled directly therewith, and the non-loaded part inertia is added to the loaded part. As mentioned above, inertia (that is, loaded part inertia) in the power transmission path in which the hydraulic power transmission device is provided can be increased, explosive vibration of the engine is easily damped at the time of the engagement of the lock-up clutch, and generation of muffled sound can be prevented. Therefore, it is possible to enlarge a lock-up region to improve fuel efficiency. In this case, since the predetermined engaging device is in the weak slip state, the gear ratios (shift ratios) of the stepped transmission vary, or tie-up of the stepped transmission is avoided.

According to the aspect of the present disclosure, the predetermined operational state is in the predetermined rotational speed region of the engine where the explosive vibration of the engine decreases as the engine speed becomes higher, and thereby the muffled sound accompanying the engagement of the lock-up clutch is easily generated. Thus, as the engagement pressure is added to the predetermined engaging device such that the predetermined engaging device is brought into the weak slip state in the predetermined operational state, the lock-up region can be enlarged by the predetermined rotational speed region of the engine.

According to the aspect the present disclosure, the weak slip state is released in a case where the heat generation amount of the predetermined engaging device brought into the weak slip state becomes equal to or greater than the predetermined heat generation amount. Thus, performance degradation, such as the durability of the predetermined engaging device accompanying an increase in the heat generation amount resulting from being brought into the weak slip state, can be prevented or suppressed, while obtaining the effect of limiting the generation of the muffled sound.

According to the aspect of the present disclosure, in a case where the predetermined engaging device is brought into the weak slip state for the predetermined time or longer, determination is made that the heat generation amount of the predetermined engaging device becomes more than the predetermined heat generation amount. Thus, an increase in the heat generation amount resulting from the predetermined engaging device being brought into the weak slip state is appropriately determined.

According to the aspect of the present disclosure, the lock-up clutch is engaged when the predetermined engaging device is brought into the weak slip state in the predetermined operational state, and the engagement of the aforementioned lock-up clutch is released in a case where the heat generation amount of the predetermined engaging device becomes equal to or greater than the predetermined heat generation amount. Thus, aggravation of the muffled sound accompanying the release of the aforementioned weak slip state can be restrained while preventing or suppressing the performance degradation of the predetermined engaging device resulting from the predetermined engaging device being brought into the weak slip state.

According to the aspect of the present disclosure, the lock-up clutch is engaged when the predetermined engaging device is brought into the weak slip state in the predetermined operational state, shift of the stepped transmission is executed in a case where the heat generation amount of the predetermined engaging device becomes equal to or greater than the predetermined heat generation amount, and the engagement of the lock-up clutch is continued in a case where the aforementioned shift of the stepped transmission is executed. Thus, aggravation of the muffled sound accompanying the release of the weak slip state of the predetermined engaging device or the continuation of the engagement of the lock-up clutch due to the shift of the stepped transmission can be prevented or suppressed while preventing or suppressing the performance degradation of the predetermined engaging device resulting from the predetermined engaging device being brought into the weak slip state.

According to the aspect of the present disclosure, the shift of the stepped transmission to a gear stage selected by the engagement of the predetermined engaging device is prohibited in a case where the shift of the stepped transmission is needed when the predetermined engaging device is brought into the weak slip state. Thus, the heat generation amount is restrained from being increased due to no engagement of the predetermined engaging device of which the heat generation amount is increased by being brought into the weak slip state. As mentioned above, the performance degradation of the predetermined engaging device can be restrained.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is an operation chart illustrating the relationship of combination between the shift operation of the automatic transmission and the operation of engaging devices used for the shift operation;

FIG. 11 is a view illustrating an example of a time chart in a case where the control operation illustrated in the flowchart of FIG. 9 is executed, and illustrating an embodiment in a case where the shift of the automatic transmission is executed in accordance with the release of the weak slip state of the target engaging device; and FIG. 12 is a time chart illustrating an example of an embodiment of weak slip control for the target engaging device, and is a view illustrating a case where the shift of the automatic transmission is needed during the aforementioned weak slip control.

DETAILED DESCRIPTION OF EMBODIMENTS

Hereinafter, embodiments of the present disclosure will be described in detail with reference to the drawings.

Figure 1:
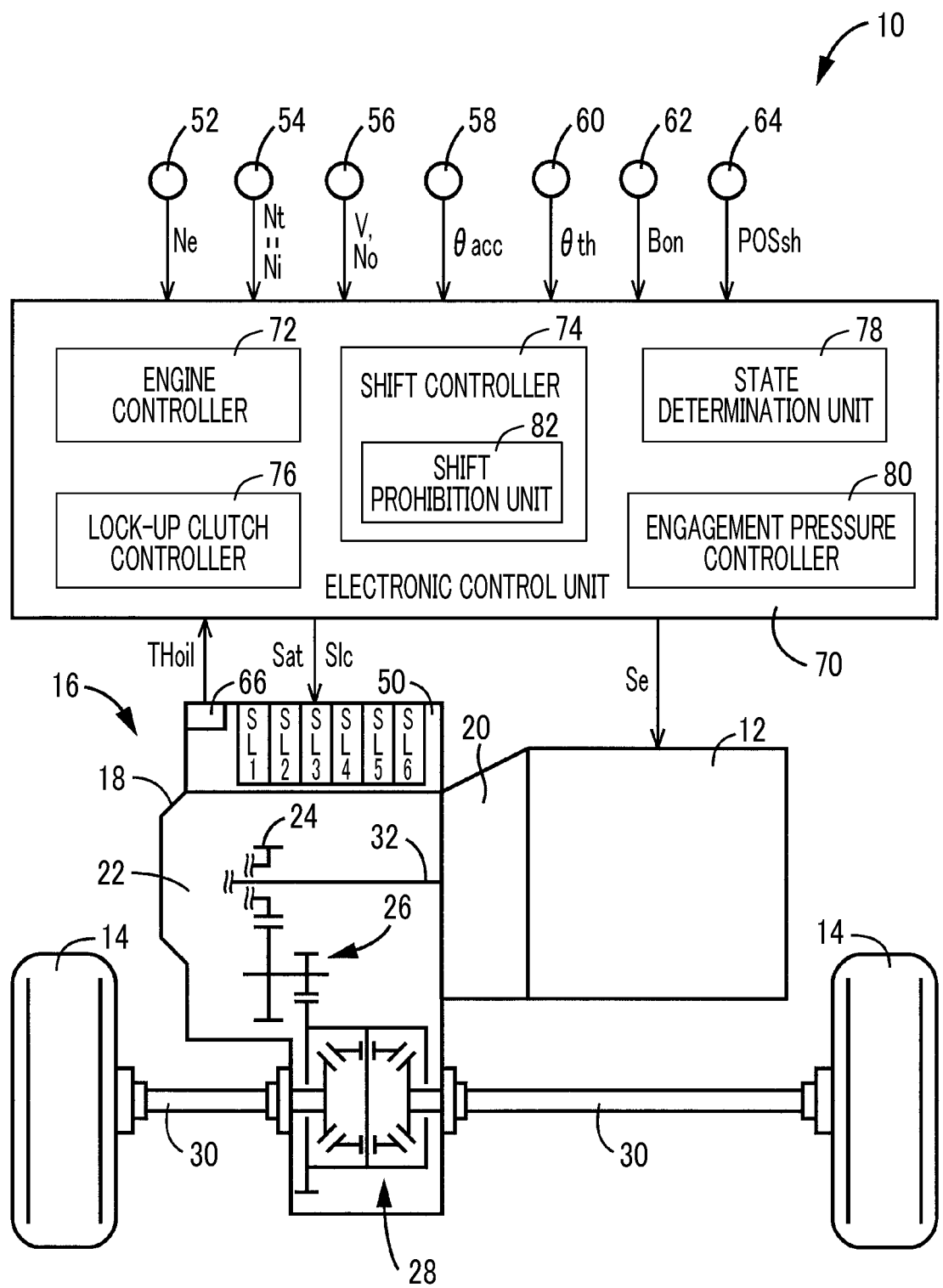
FIG. 1 is a view illustrating a schematic configuration of a vehicle to which the present disclosure is applied, and is a view illustrating control functions and main parts of a control system, for various kinds of control in the vehicle.

FIG. 1 is a view illustrating a schematic configuration of a vehicle 10 to which the present disclosure is applied, and is a view illustrating main parts of a control system for various kinds of control in the vehicle 10. In FIG. 1, the vehicle 10 includes an engine 12, drive wheels 14, a vehicular power transmission device 16 (hereinafter, referred to as a power transmission device 16) provided on a power transmission path between the engine 12 and the drive wheels 14. The power transmission device 16 has a torque converter 20, an automatic transmission 22, a reduction gear mechanism 26 coupled to a transmission output gear 24 that is an output rotating member of the automatic transmission 22, a differential gear (differential gear mechanism) 28 coupled to the aforementioned reduction gear mechanism 26, and the like, within a case 18 serving as a non-rotary member attached to a vehicle body. The power transmission device 16 includes a pair of drive shafts (vehicle axles) 30 coupled to the differential gear 28, and the like. In the power transmission device 16, the power (torque and force are also synonymous especially when distinction is not made) output from the engine 12 is transmitted to the drive wheels 14 sequentially via the torque converter 20, the automatic transmission 22, the reduction gear mechanism 26, the differential gear 28, the drive shafts 30, and the like.

The engine 12 is a power source of the vehicle 10, and is a well-known internal combustion engine, such as a gasoline engine or a diesel engine. In the engine 12, engine torque Te is controlled by controlling operational states, such as intake air amount, fuel supply amount, and ignition timing, by an electronic control unit 70 to be described below.

Figure 2:
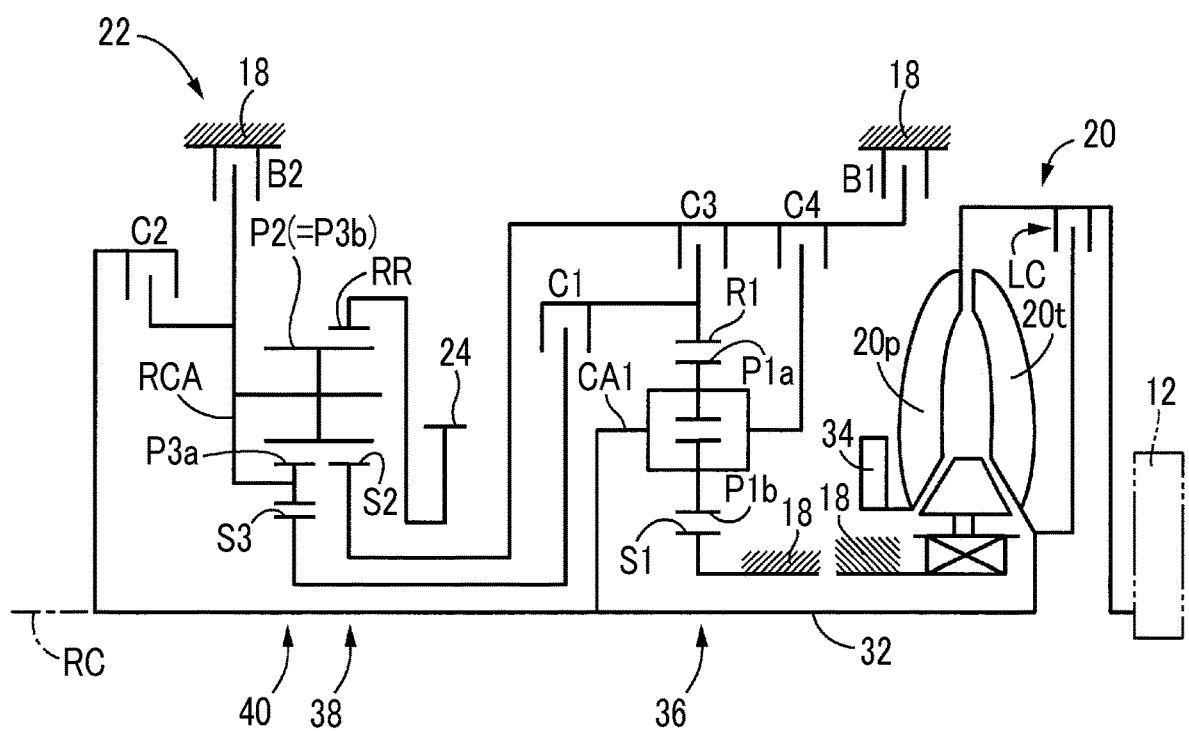
FIG. 2 is a skeleton diagram illustrating an example of a torque converter and an automatic transmission.
Figure 3:
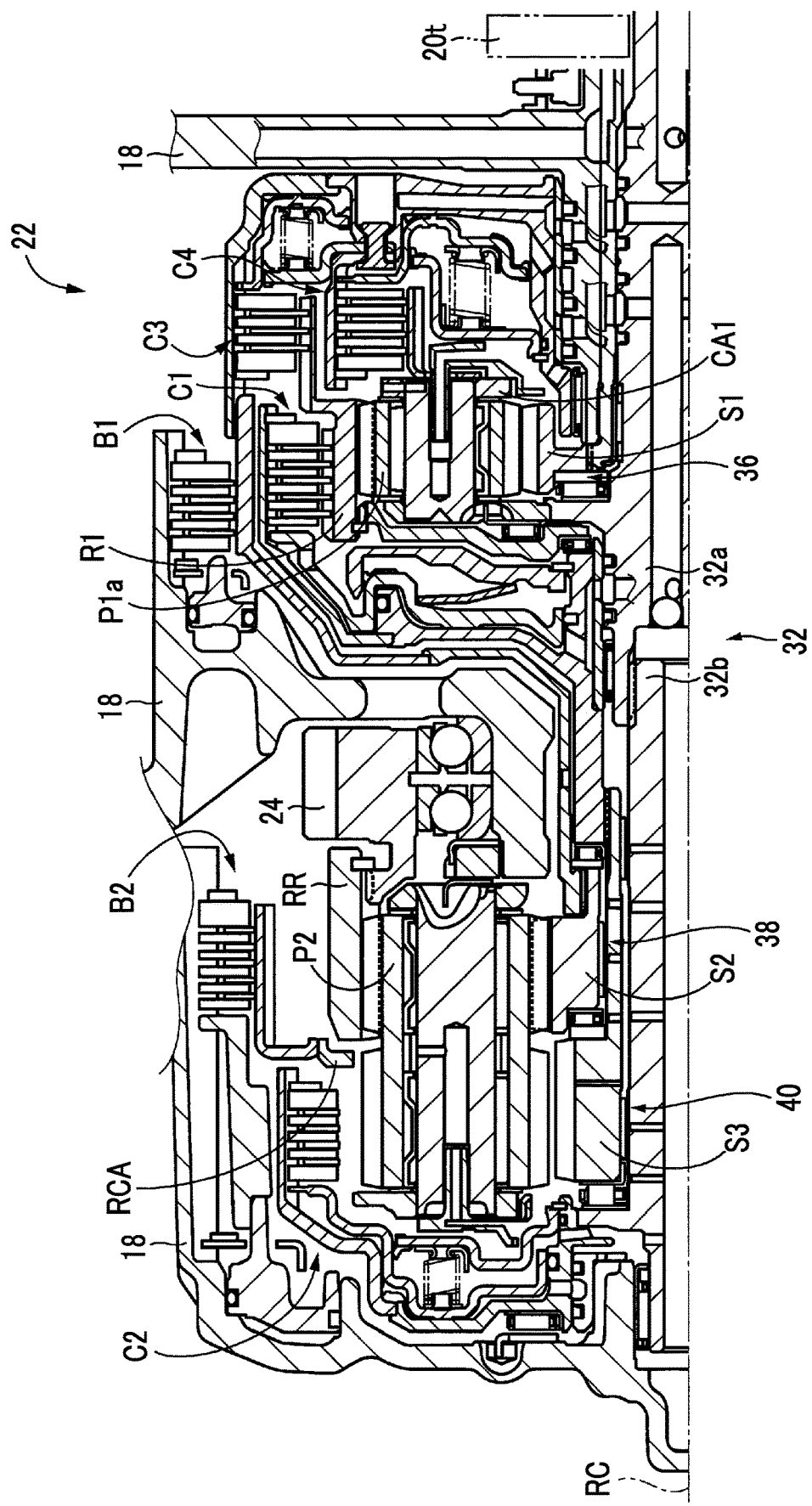
FIG. 3 is a sectional view of the automatic transmission illustrated in FIG. 2.

FIG. 2 is a skeleton diagram illustrating an example of the torque converter 20 and the automatic transmission 22. FIG. 3 is a sectional view of the automatic transmission 22 illustrated in FIG. 2. The torque converter 20, the automatic transmission 22, and the like are configured symmetrically with respect to an axis RC of a transmission input shaft 32 that is an input rotating member of the automatic transmission 22, and a lower half of the aforementioned axis RC is omitted in FIG. 2 and FIG. 3 (in the present specification, the term "symmetrical" includes the meaning "substantially symmetrical").

In FIG. 2, the torque converter 20 is disposed so as to rotate around the axis RC in a power transmission path between the engine 12 and the automatic transmission 22, and is a hydraulic power transmission device including a pump impeller 20p, a turbine wheel 20t, or the like. The pump impeller 20p is an input rotating member of the torque converter 20, and is coupled to the engine 12. The turbine wheel 20t is an output rotating member of the torque converter 20, and is coupled to the transmission input shaft 32. The transmission input shaft 32 is also a turbine shaft that is rotationally driven by the turbine wheel 20t. The torque converter 20 includes a well-known lock-up clutch LC serving as a directly-coupled clutch that couples the pump impeller 20p and the turbine wheel 20t together (that is, couples the input and output rotating members of the torque converter 20 together). The power transmission device 16 includes a mechanical oil pump 34 coupled to the pump impeller 20p. The oil pump 34 is rotationally driven by the engine 12, thereby discharging hydraulic oil for being used for the shift control of the automatic transmission 22, for being used for switching control of the operating state of the lock-up clutch LC, or for supplying lubricating oil to respective parts of the power transmission device 16. That is, the hydraulic oil pumped up by the oil pump 34 is supplied as a source pressure of a hydraulic control circuit 50 (refer to FIG. 1) included in the vehicle 10.

The lock-up clutch LC is a hydraulic friction clutch that is frictionally engaged by supplying engagement hydraulic pressure (also referred to as LC hydraulic pressure) from the hydraulic control circuit 50. The operating states of the lock-up clutch LC are switched by controlling the LC hydraulic pressure by the electronic control unit 70 to be described below. As the operating states of the lock-up clutch LC, there are a lock-up release state where the lock-up clutch LC is released, a slip state where the lock-up clutch LC is slipped, and a lock-up state where the lock-up clutch LC is engaged (locked up). By releasing the lock-up clutch LC, the torque amplification action of the torque converter 20 is obtained. By engaging lock-up clutch LC, the pump impeller 20p and the turbine wheel 20t are rotated integrally, and the power of the engine 12 is directly transmitted to the automatic transmission 22 side. By slipping the lock-up clutch LC (that is, bringing the lock-up clutch LC into the slip state) such that the slip amount Ns (=Engine speed Ne−Turbine rotational speed Nt; also referred to as slip rotational speed or differential rotational speed) of the lock-up clutch LC becomes a target slip amount Nst, when the vehicle 10 is driven (powered on), over revolution of the engine speed Ne is avoided or noise, such as muffled sound, is limited. On the other hand, when the vehicle 10 is not driven (powered off), the engine 12 is rotated to follow the transmission input shaft 32 with the target slip amount Nst, for example, a fuel cut region is enlarged.

In FIG. 2 and FIG. 3, the automatic transmission 22 is a stepped automatic transmission that constitutes a portion of the power transmission path between the engine 12 and the drive wheels 14. The automatic transmission 22 is a planetary-gear-type multistage transmission having a double-pinion-type first planetary gear device 36, and a single-pinion-type second planetary gear device 38, which is constituted of Ravigneaux type, and a double-pinion-type third planetary gear device 40 on a coaxial line (on the axis RC). The automatic transmission 22 includes a plurality of engaging devices (hereinafter, simply referred to as engaging devices CB especially when distinction is not made) of a first clutch C1, a second clutch C2, a third clutch C3, a fourth clutch C4, a first brake B1, and a second brake B2. As illustrated in FIG. 3, the transmission input shaft 32 of the automatic transmission 22 includes a first rotating shaft 32a coupled to the turbine wheel 20t of the torque converter 20, and a second rotating shaft 32b that is rotated integrally with the first rotating shaft 32a by being spline-fitted to the first rotating shaft 32a.

The first planetary gear device 36 includes a first sun gear S1, a plurality of pairs of first planetary gears P1a, P1b that mesh with each other, a first carrier CA1 that supports the first planetary gears P1a, P1b in rotatable and revolvable manners, and a first ring gear R1 that meshes with the first sun gear S1 via the first planetary gears P1a, P1b. The second planetary gear device 38 includes a second sun gear S2, a second planetary gear P2, a carrier RCA that supports the second planetary gear P2 in rotatable and revolvable manners, and a ring gear RR that meshes with the second sun gear S2 via the second planetary gear P2. The third planetary gear device 40 includes a third sun gear S3, a plurality of pairs of third planetary gears P3a, P3b that mesh with each other, the carrier RCA that supports the third planetary gears P3a, P3b in rotatable and revolvable manners, and the ring gear RR that meshes with the third sun gear S3 via the third planetary gears P3a, P3b. In the second planetary gear device 38 and the third planetary gear device 40, the third planetary gear P3b is of a so-called Ravigneaux type which is shared with the second planetary gear P2 and in which the carrier is constituted of the common carrier RCA and the ring gear is constituted of the common ring gear RR.

The engaging devices CB are hydraulic frictional engaging devices comprising wet-multiplate-type clutches, brakes, or the like that are pressed by hydraulic actuators. The operating states (states, such as engagement and release) of the engaging devices CB are switched by changing respective torque capacities (clutch torques) Tc (that is, clutch torques Tc1, Tc2, Tc3, Tc4, Tb1, Tb2) respectively with respective hydraulic pressures (clutch pressures) Pc (that is, clutch pressures Pc1, Pc2, Pc3, Pc4, Pb1, Pb2) serving as engagement pressures that are respectively output from solenoid valves SL1 to SL6, and the like within the hydraulic control circuit 50. In order to transmit torque (for example, input torque Ti input to the transmission input shaft 32, that is, turbine torque Tt) between the transmission input shaft 32 and the transmission output gear 24 without slipping the engaging devices CB (that is, without causing the differential rotational speed in the engaging devices CB), there is a need for a torque capacity capable of obtaining a partial transmission torque (that is, the share torque of each engaging device CB) by which each engaging device CB needs to cover the aforementioned torque. However, in the torque capacity capable of obtaining the partial transmission torque, the transmission torque is not increased even when the torque capacity is increased. In the present embodiment, the clutch torques Tc and the clutch pressures Pc may be treated synonymously for the sake of convenience.

In the automatic transmission 22, the first sun gear S1 is coupled to the case 18. The first carrier CA1 is coupled to the transmission input shaft 32. The first carrier CA1 and the second sun gear S2 are selectively coupled together via the fourth clutch C4. The first ring gear R1 and the third sun gear S3 are selectively coupled together via the first clutch C1. The first ring gear R1 and the second sun gear S2 are selectively coupled together via the third clutch C3. The second sun gear S2 is selectively coupled to the case 18 via the first brake B1. The carrier RCA is selectively coupled to the transmission input shaft 32 via the second clutch C2. The carrier RCA is selectively coupled to the case 18 via the second brake B2. The ring gear RR is coupled to the transmission output gear 24.

The automatic transmission 22 is a stepped transmission in which any of the engaging devices CB is selectively engaged in accordance with accelerator operation of a driver, vehicle speed V, or the like by the electronic control unit 70 to be described below, and thereby one gear stage of a plurality of gear stages (shift stages) with different gear ratios (shift ratios) γ (=AT input rotational speed Ni/AT output rotational speed No) is selected. In the automatic transmission 22, for example as illustrated in an engagement operation table of FIG. 4, respective gear stages of eight forward gear stages of a first speed gear stage "1st" to an eighth speed gear stage "8th" and a reverse gear stage "Rev" are selected. The AT input rotational speed Ni is the rotational speed (that is, the input rotational speed of the automatic transmission 22) of the transmission input shaft 32, and the AT output rotational speed No is the rotational speed (that is, the output rotational speed of the automatic transmission 22) of the transmission output gear 24. The gear ratios γ of the automatic transmission 22 corresponding to the respective gear stages are appropriately determined depending on respective gear ratios (=Number of teeth of sun gear/Number of teeth of ring gear) ρ1, ρ2, ρ3 of the first planetary gear device 36, the second planetary gear device 38, and the third planetary gear device 40. A gear ratio γ of the first speed gear stage "1st" is the greatest, and the gear ratios decrease as the vehicle speed increases (towards the eighth speed gear stage "8th" side).

The engagement operation table of FIG. 4 is obtained by summarizing the relationship between the respective gear stages selected in the automatic transmission 22 and the respective operating states of the engaging devices CB, wherein "O" represents engagement, and a blank space represents release. As illustrated in FIG. 4, in the forward gear stages, the first speed gear stage "1st" is established by the engagement of the first clutch C1 and the second brake B2. The second speed gear stage "2nd" is established by the engagement of the first clutch C1 and the first brake B1. The third speed gear stage "3rd" is established by the engagement of the first clutch C1 and the third clutch C3. The fourth speed gear stage "4th" is established by the engagement of the first clutch C1 and the fourth clutch C4. The fifth speed gear stage "5th" is established by the engagement of the first clutch C1 and the second clutch C2. The sixth speed gear stage "6th" is established by the engagement of the second clutch C2 and the fourth clutch C4. The seventh speed gear stage "7th" is established by the engagement of the second clutch C2 and the third clutch C3. The eighth speed gear stage "8th" is established by the engagement of the second clutch C2 and the first brake B1. The reverse gear stage "Rev" is established by the engagement of the third clutch C3 and second brake B2. By releasing all of the engaging devices CB, the automatic transmission 22 is brought into a neutral state where any gear stages are not selected (that is, a neutral state where power transmission is cut off).

Referring back to FIG. 1, the vehicle 10 includes the electronic control unit 70 serving as a controller including, for example, a control device for the vehicle 10 related to the control of the engaging devices CB and the like. The electronic control unit 70 is configured to include a so-called microcomputer including, for example, a CPU, a RAM, a ROM, input and output interfaces, and the like, the CPU executes various kinds of control of the vehicle 10 by performing signal processing in accordance with a program stored in advance in the ROM, using a temporary storage function of the RAM. The electronic control unit 70 is configured to be divided into engine control use, hydraulic control use, and the like as needed.

Various signals (for example, the engine speed Ne, the AT input rotational speed Ni that is also the rotational speed of the turbine shaft (that is, the turbine rotational speed Nt), the AT output rotational speed No corresponding to the vehicle speed V, an accelerator operation amount θacc that is the operation amount of an accelerator pedal, a throttle valve opening degree θth that is the opening degree of an electronic throttle valve, a brake-on signal Bon showing a brake operation state where a brake operating member for operating wheel brakes is operated by a driver, the operation positions (shift positions) POSsh of a shift lever, such as "P", "R", "N", and "D", a hydraulic oil temperature THoil that is the temperature of the hydraulic oil within the hydraulic control circuit 50, and the like) based on the detection values obtained by various sensors (for example, an engine speed sensor 52, an input rotational speed sensor 54, an output rotational speed sensor 56, an accelerator operation amount sensor 58, a throttle valve opening degree sensor 60, a brake switch 62, a shift position sensor 64, an oil temperature sensor 66, and the like) provided in the vehicle 10 are supplied to the electronic control unit 70. Various command signals (for example, an engine control command signal Se for controlling the engine 12, a hydraulic control command signal Sat for controlling the operating states of the engaging devices CB, a hydraulic control command signal S1c for controlling the operating state of the lock-up clutch LC, and the like) are output from the electronic control unit 70 to the respective devices (for example, the engine 12, the hydraulic control circuit 50, and the like) included in the vehicle 10. The hydraulic control command signal Sat is, for example, a command signal (that is, a driving current according to an instruction pressure corresponding to each of the set clutch pressures Pc) for driving each of the solenoid valves SL1 to SL6, which regulates each clutch pressure Pc to be supplied to each hydraulic actuator of each engaging device CB, and is output to the hydraulic control circuit 50. The hydraulic control command signal S1c is, for example, a command signal for driving a solenoid valve or the like that regulates the LC hydraulic pressure, and is output to the hydraulic control circuit 50.

The electronic control unit 70 includes engine control means, that is, an engine controller 72, shift control means, that is, a shift controller 74, and lock-up clutch control means, that is, a lock-up clutch controller 76, in order to realize control functions for various kinds of control in the vehicle 10.

The engine controller 72 controls the engine 12 such that a needed engine torque Te is obtained. For example, the engine controller 72 applies the accelerator operation amount θacc and the vehicle speed V (also corresponding to the AT output rotational speed No or the like) to a relationship (for example, a drive force map) that is obtained experimentally or designed in advance and is stored (that is, is determined in advance), thereby calculating a needed drive torque Tdem as a needed drive amount. The engine controller 72 sets a target engine torque Tetgt for realizing the needed drive torque Tdem in consideration of a gear stage of the automatic transmission 22, and outputs the engine control command signal Se for controlling the engine 12 such that the aforementioned target engine torque Tetgt is obtained, to a throttle actuator, a fuel injection device, an ignition device, or the like. As the needed drive amount, a needed drive power Fdem [N] in the drive wheels 14, a needed drive power Pdem [W] in the drive wheels 14, the needed transmission output torque Todem in the automatic transmission 22, or the like can also be used in addition to the needed drive torque Tdem [Nm] in the drive wheels 14. As the needed drive amount, simply, the accelerator operation amount θacc [%], the throttle valve opening degree θth [%], or the like can also be used.

The shift controller 74 executes the shift control of the automatic transmission 22. For example, the shift controller 74 applies the vehicle speed V (also corresponding to the AT output rotational speed No or the like) and the accelerator operation amount θacc (also corresponding to the needed drive torque Tdem, the throttle valve opening degree θth, or the like) to a predetermined relationship (for example, a shift map), thereby determining shift of the automatic transmission 22 (that is, determining a gear stage selected by the automatic transmission 22). The shift controller 74 outputs the hydraulic control command signal Sat serving as a shift command for switching the operating states of the engaging devices CB to the hydraulic control circuit 50 so as to select the aforementioned determined gear stage.

The shift controller 74 performs a so-called clutch-to-clutch shift of clutching an engaging device that participates in the shift of the automatic transmission 22 among the engaging devices CB (that is, switches engagement and release of the engaging device that participates in the shift) at the time of the shift of the automatic transmission 22. For example, in 5→6 upshift from the fifth speed gear stage "5th" to the sixth speed gear stage "6th", clutching is performed by the first clutch C1 and the fourth clutch C4 (that is, the clutch-to-clutch shift in which the first clutch C1 is released and the fourth clutch C4 is engaged is executed).

The lock-up clutch controller 76 controls the operating state of the lock-up clutch LC. For example, the lock-up clutch controller 76 inputs the vehicle speed V (also corresponding to the AT output rotational speed No or the like) and the accelerator operation amount θacc (also corresponding to the needed drive torque Tdem, the throttle valve opening degree θth, or the like) to a predetermined relationship (for example, a lock-up region diagram) defining a lock-up off region, a slip operation region, and a lock-up region, thereby determining which region the lock-up clutch belongs to, and outputs the hydraulic control command signal S1c for supplying the LC hydraulic pressure for realizing an operating state corresponding to the determined region to the lock-up clutch LC, to the hydraulic control circuit 50.

The lock-up clutch controller 76 executes the lock-up control of setting the LC hydraulic pressure for obtaining the torque capacity of the lock-up clutch LC capable of transmitting the engine torque Te (that is, input torque to lock-up clutch LC) to lock up the lock-up clutch LC, in a case where the lock-up clutch is determined to be in the lock-up region.

When the torque capacity of the lock-up clutch LC is less than the engine torque Te, slip occurs in the lock-up clutch LC. The lock-up clutch controller 76 executes the slip control of setting the LC hydraulic pressure for realizing the target slip amount Nst with respect to the engine torque Te to slip the lock-up clutch LC (that is, bring the lock-up clutch into a slip state), in a case where the lock-up clutch is determined to be in the slip operation region. In the lock-up region diagram, the slip operation region is set in, for example, a region where the vehicle speed is lower than that in the lock-up region, and is a region where the execution of the lock-up control is difficult and where the fuel efficiency or drivability in the slip state is improved. The slip operation region is also a region that is set in consideration of the drivability, the muffled sound (for example, NV (noise and vibration) performance), and the like. For that reason, the target slip amount Nst is determined to have a greater value in a region where the engine torque Te is greater or in a region where the engine speed Ne is lower, which is disadvantageous to the muffled sound or the like accompanied by lock-up, for example.

Here, in the vehicle 10, it is effective to engage the lock-up clutch LC from a viewpoint of improving the fuel efficiency. Meanwhile, as one of the transmission paths of the muffled sound, there is a path along which explosive vibration of the engine 12 is transmitted to the vehicle body (body) through the drive shafts 30. During traveling for which the lock-up clutch LC is engaged (also referred to as "during lock-up traveling"), the explosive vibration of the engine 12 is not easily damped (that is, the torque fluctuation of the drive shafts 30 is likely to become great), and the muffled sound is likely to increase. For that reason, a low-speed rotation region of the engine 12 where the explosive vibration of the engine 12 is greater than the high-speed rotation region of the engine 12, is determined as the lock-up off region. When generation of the muffled sound during the lock-up traveling can be limited (that is, when the torque fluctuation of the drive shafts 30 can be reduced), the lock-up region can be extended. The extension of the lock-up region to the low-speed rotation region of the engine 12 will be described below in detail.

In the automatic transmission 22, in each gear stage, a non-loaded part 92 (refer to FIG. 5) that is a part that does not participate in power transmission (that is, a part capable of being rotated without power transmission) is separated from a loaded part 90 (refer to FIG. 5) that is a part that participates in the power transmission (that is, a part on a torque flow).

Figure 5:
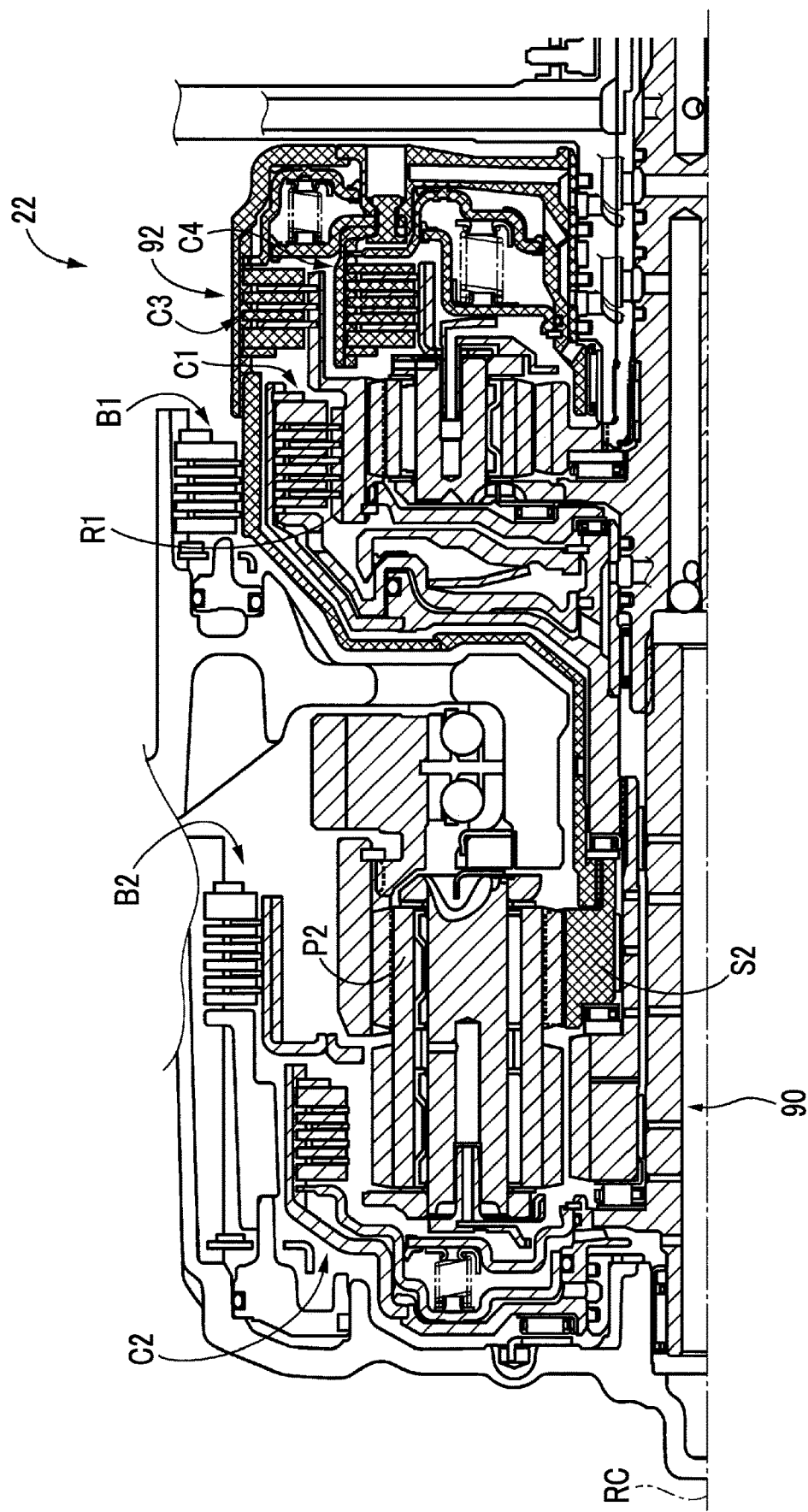
FIG. 5 is a sectional view of the automatic transmission illustrating a loaded part and a non-loaded part when a fifth speed gear stage is selected in the automatic transmission.

FIG. 5 is a sectional view of the automatic transmission 22 illustrating the loaded part 90 and the non-loaded part 92 when the fifth speed gear stage "5th" is selected in the automatic transmission 22. In FIG. 5, in the fifth speed gear stage "5th", the first clutch C1 and the second clutch C2 are engaged and the third clutch C3, the fourth clutch C4, the first brake B1, and second brake B2 are released. Thus, the loaded part 90 as illustrated in a hatched part, and the non-loaded part 92 as illustrated in a shaded part are constituted. The second sun gear S2 that belongs to the non-loaded part 92 and the second planetary gear P2 that belongs to the loaded part 90 mesh with each other. For that reason, the second sun gear S2 is rotated together (that is, the non-loaded part 92 is rotated together) with the rotation of the loaded part 90 (with the rotation of second planetary gear P2).

Clearance is generated between the loaded part 90 and the non-loaded part 92 (especially a coupling part between the loaded part 90 and the non-loaded part 92 (an engaging part between the second planetary gear P2 and the second sun gear S2 when the fifth speed gear stage "5th" is selected)). The clearance includes all the clearances in the non-loaded part 92. Since no torque is transmitted between the loaded part 90 and the non-loaded part 92, the non-loaded part 92 moves relative to the loaded part 90 within a range of the clearance (rotates with play). In this case, the non-loaded part 92 alternately collides against a driving-side part (for example, a wall surface of a gear) and a driven-side part of the loaded part 90.

In a case where the explosive vibration of the engine 12 is relatively great as in the low-speed rotation region of the engine 12, the frequency of the aforementioned collision increases. On the other hand, in a case where the explosive vibration of the engine 12 is relatively small as in the high-speed rotation region of the engine 12, the frequency of the aforementioned collision tends to decrease. As the frequency of the collision increases, the non-loaded part inertia is likely to be added to the loaded part 90. As the frequency of the collision decreases, missing of the non-loaded part inertia is likely to occur in the loaded part 90. As the missing of the non-loaded part inertia is likely to occur, the loaded part inertia is substantially reduced. Thus, the explosive vibration of the engine 12 is not easily damped (that is, the torque fluctuation of the drive shafts 30 is not easily prevented). For that reason, the explosive vibration of the engine 12 becomes relatively smaller as the engine speed Ne increases. Accordingly, originally, the generation of the muffled sound is easily limited. However, a phenomenon in which the missing of the non-loaded part inertia is likely to occur and the generation of the muffled sound is not rather easily limited may occur in some cases. The phenomenon as mentioned above occurs more conspicuously in a case where the non-loaded part inertia increases as the number of stages of the automatic transmission 22 increases (that is, in a case where the loaded part inertia decreases).

The electronic control unit 70 executes the weak slip control of adding an engagement pressure (clutch pressure Pc) to a predetermined engaging device that is capable of mutually coupling a rotating member of the loaded part 90 and a rotating member of the non-loaded part 92 that rotate relative to each other in the predetermined gear stage (also corresponding to a current gear stage) of the automatic transmission 22 and released at the time of selection of a predetermined gear stage of the automatic transmission 22 such that the predetermined engaging device is brought into a weak slip state in a range that does not affect the selection of the predetermined gear stage of the automatic transmission 22, in a predetermined operational state when the generation of the muffled sound is limited as the missing of the non-loaded part inertia does not easily occur. By executing the weak slip control, the drag torque in the predetermined engaging device is increased. As mentioned above, the non-loaded part inertia continues being pressed in a counter-torque direction (that is, the driven-side part) of the clearance in a rotational direction of the coupling part between the non-loaded part 92 and the loaded part 90 coupled directly therewith, the missing of the non-loaded part inertia is suppressed or prevented, and the non-loaded part inertia is added to the loaded part 90.

For example, in a case where the predetermined gear stage of the automatic transmission 22 is the fifth speed gear stage "5th", the rotating member of the loaded part 90 that makes the relative rotation is the first ring gear R1, the rotating member of the non-loaded part 92 that makes the relative rotation is the second sun gear S2, and the predetermined engaging device is the third clutch C3. The coupling part between the non-loaded part 92 and the loaded part 90 coupled directly therewith is the engaging part between the second planetary gear P2 and the second sun gear S2. Since the predetermined engaging device is an engaging device used as a target on which the weak slip control is executed, in a present embodiment, the predetermined engaging device may be referred to as a weak slip target engaging device (or a target engaging device).

Figure 6:
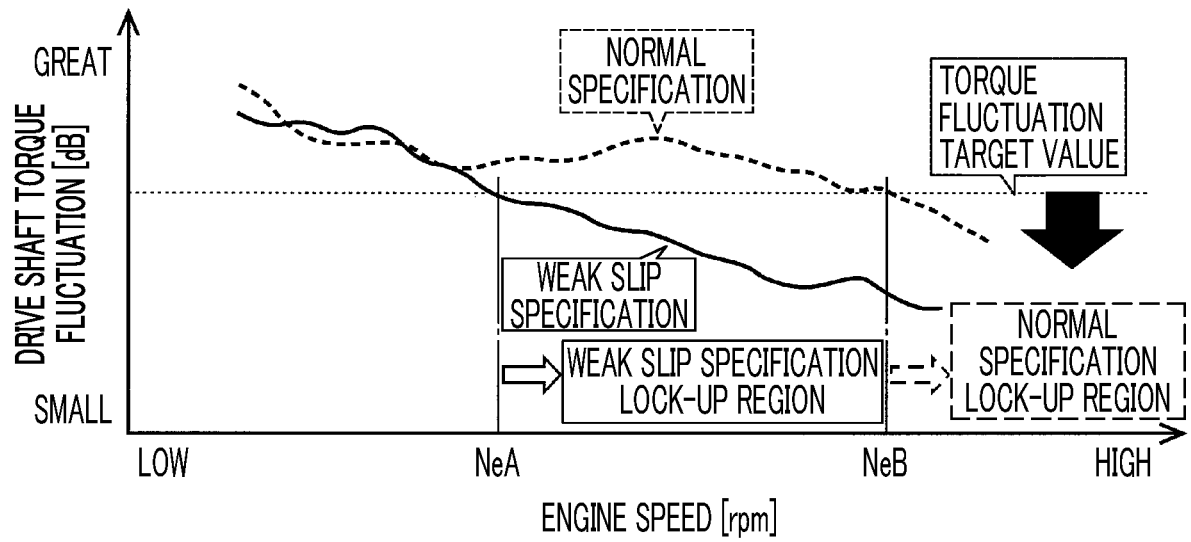
FIG. 6 is a graph illustrating the relationship between engine speed and drive shaft torque fluctuation in a predetermined gear stage of the automatic transmission.

FIG. 6 is a graph illustrating the relationship between the engine speed Ne and drive shaft torque fluctuation in the predetermined gear stage of the automatic transmission 22. In FIG. 6, the drive shaft torque fluctuation indicates the magnitude of the torque fluctuation in the drive shafts 30 when the explosive vibration of the engine 12 is transmitted. The properties of "normal specification" illustrated by a dashed line in FIG. 6 show a state of normal drive shaft torque fluctuation when the weak slip control for the target engaging device is not executed. The properties of "weak slip specification" illustrated by a solid line in FIG. 6 show a state of the drive shaft torque fluctuation when the weak slip control for the target engaging device is executed.

In the above "normal specification", in a region where the engine speed Ne becomes less than an engine speed NeA, the explosive vibration of the engine 12 is relatively large, and thereby the drive shaft torque fluctuation exceeds a torque fluctuation target value. Even when the engine speed Ne becomes greater than the engine speed NeA, the missing of the non-loaded part inertia resulting from the explosive vibration of the engine 12 becoming relatively small is likely to occur. Accordingly, since a decrease in the drive shaft torque fluctuation is prevented, the drive shaft torque fluctuation is not reduced to the torque fluctuation target value or less. In the above "normal specification", when the engine speed Ne becomes equal to or higher than an engine speed NeB greater than the engine speed NeA, the explosive vibration of the engine 12 decreases. Accordingly, even when the missing of the non-loaded part inertia occurs, the drive shaft torque fluctuation is reduced to the torque fluctuation target value or less. The torque fluctuation target value is, for example, a predetermined upper limit value of the drive shaft torque fluctuation such that the generation of the muffled sound during the lock-up traveling does not pose a problem. Therefore, in the above "normal specification", a region of the engine speed Ne equal to or greater than engine speed NeB, where the drive shaft torque fluctuation becomes equal to or less than the torque fluctuation target value, is determined as the lock-up region.

In the above "weak slip specification", in a region where the engine speed Ne becomes less than an engine speed NeA, the explosive vibration of the engine 12 is originally large. Thus, the effect of the weak slip control for the target engaging device is not obtained, and similar to the above "normal specification", the drive shaft torque fluctuation exceeds the torque fluctuation target value. In the above "weak slip specification", when the engine speed Ne becomes equal to or greater than the engine speed NeA, the missing of the non-loaded part inertia does not easily occur due to the weak slip control for the target engaging device. Accordingly, as the explosive vibration of the engine 12 becomes relatively small, the drive shaft torque fluctuation is also made small, and the drive shaft torque fluctuation is reduced to the torque fluctuation target value or less. Therefore, in the above "weak slip specification", a region of the engine speed Ne equal to or greater than the engine speed NeA where the drive shaft torque fluctuation becomes equal to or less than the torque fluctuation target value is determined as the lock-up region, and the lock-up region is expanded to the low-speed rotation region of the engine 12 as compared to the above "normal specification". In the region where the engine speed Ne is equal to or greater than the engine speed NeB, as illustrated in the above "normal specification", the drive shaft torque fluctuation is reduced to the torque fluctuation target value or less even when the weak slip control for the target engaging device is not executed. For that reason, the weak slip control for the target engaging device may be executed at least in a predetermined rotational speed region of the engine 12 where the engine speed Ne is equal to or greater than the engine speed NeA and less than the engine speed NeB. The predetermined operational state where the weak slip control for the target engaging device is executed is a region capable of being locked up by the aforementioned effect of the weak slip control. In other words, the predetermined operational state is in a region that cannot be locked up unless the weak slip control for the target engaging device is executed because the explosive vibration of the engine 12 becomes relatively small, and thereby the missing of the non-loaded part inertia is likely to occur and the generation of the muffled sound is not rather easily limited. That is, the predetermined operational state is in a predetermined rotational speed region of the engine 12 where the explosive vibration of the engine 12 becomes relatively smaller as the engine speed Ne increases, and thereby the muffled sound accompanying the engagement of the lock-up clutch LC is easily generated.

The electronic control unit 70 further includes state determination means, that is, a state determination unit 78, and engagement pressure control means, that is, an engagement pressure controller 80, in order to appropriately execute the weak slip control for the target engaging device as mentioned above.

Specifically, the state determination unit 78 determines whether or not the engine 12 is in the predetermined operational state (for example, a region capable of being locked up by the effect of the weak slip control for the target engaging device). For example, the state determination unit 78 determines whether or not the engine 12 is in the predetermined operational state, based on whether or not the engine speed Ne is equal to or greater than the engine speed NeA and less than the engine speed NeB. The engine speed NeA and the engine speed NeB are determined in advance as different values, for example, depending on which gear stage is the predetermined gear stage of the automatic transmission 22.

The engagement pressure controller 80 executes the weak slip control for the target engaging device, in a case where determination is made to be the predetermined operational state by the state determination unit 78. Specifically, the engagement pressure controller 80 adds the clutch pressure Pc to the target engaging device such that the target engaging device is brought into the weak slip state within a range that does not affect the selection of the predetermined gear stage. The clutch pressure Pc for bringing the target engaging device into the weak slip state is, for example, such a predetermined clutch pressure Pc that the drag torque via the hydraulic oil increases in the target engaging device. That is, the clutch pressure Pc for bringing the target engaging device into the weak slip state is such a predetermined clutch pressure Pc that is a sufficient pressure for the non-loaded part inertia is continuously pressed in the counter-torque direction of the clearance in the rotational direction of the coupling part between the non-loaded part 92 and the loaded part 90 coupled directly therewith. Therefore, the clutch pressure Pc for bringing the target engaging device into the weak slip state is not, for example, a clutch pressure Pc under which the target engaging device is half-engaged or engaged such that the transmission torque is generated in the target engaging device and the automatic transmission 22 is tied up or the gear ratio γ in the predetermined gear stage of the automatic transmission 22 is changed. In an extreme instance, the clutch pressure Pc for bringing the target engaging device into the weak slip state is a predetermined clutch pressure Pc within a range from a clutch pressure Pc exceeding zero to a clutch pressure Pc under which the target engaging device is completely engaged.

The engagement pressure controller 80 releases the weak slip control for the target engaging device, in a case where determination is made not to be the predetermined operational state by the state determination unit 78, when the weak slip control for the target engaging device is executed.

The lock-up clutch controller 76 engages the lock-up clutch LC when the target engaging device is brought into the weak slip state in the predetermined operational state by the engagement pressure controller 80.

Figure 7:
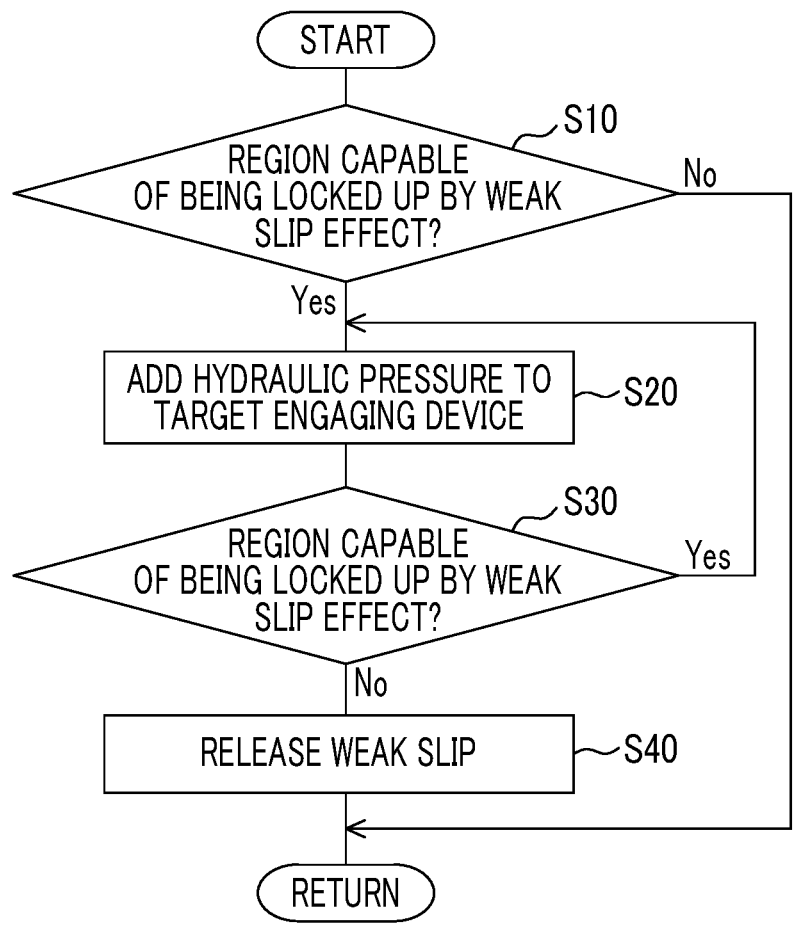
FIG. 7 is a flowchart illustrating a main part of the control operation, that is, extending a lock-up region for the control operation of an electronic control unit to improve fuel efficiency.
Figure 8:
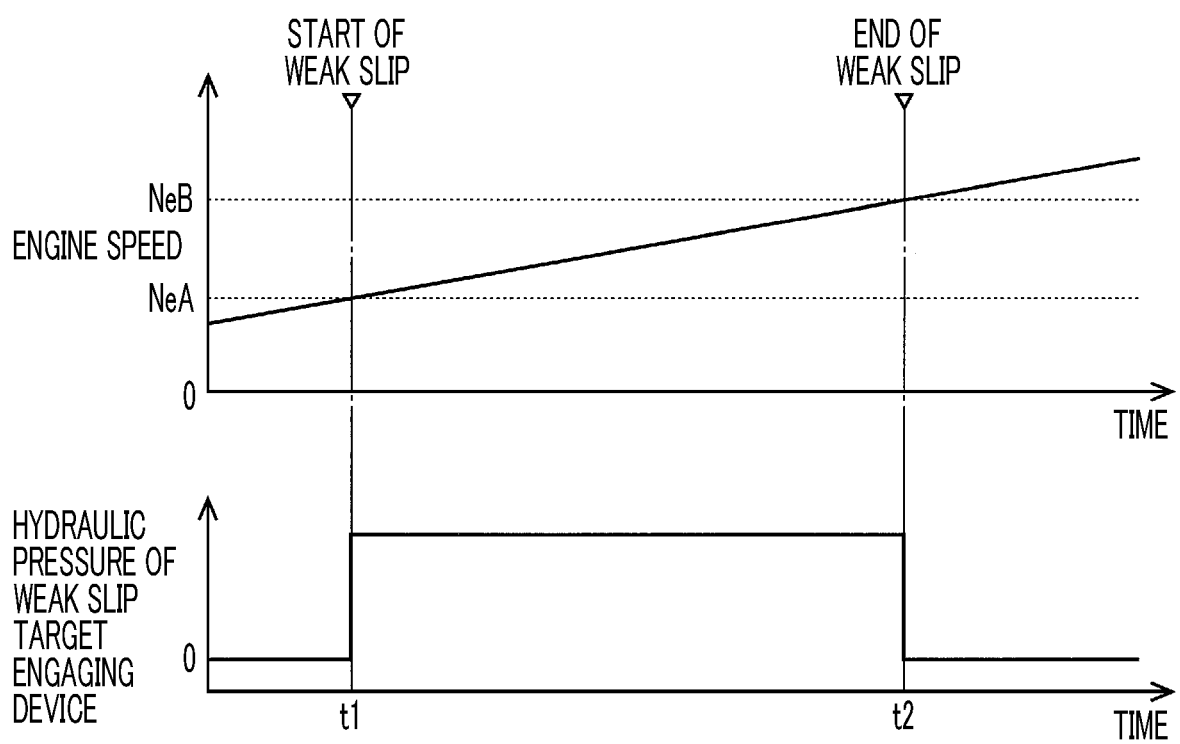
FIG. 8 is a view illustrating an example of a time chart in a case where the control operation illustrated in the flowchart of FIG. 7 is executed.

FIG. 7 is a flowchart illustrating the main part of the control operation, that is, extending the lock-up region for the control operation of the electronic control unit 70 to improve the fuel efficiency, and for example, the main part of the control operation is repeatedly executed. FIG. 8 is a view illustrating an example of a time chart in a case where the control operation illustrated in the flowchart of FIG. 7 is executed.

In FIG. 7, first, in Step (hereinafter, the term "Step" is omitted) S10 corresponding to a function of the state determination unit 78, determination is made whether or not the engine 12 is in the predetermined operational state (for example, the region capable of being locked up by the effect of the weak slip control for the target engaging device). A main routine is ended in a case where the determination of S10 is negative. In a case where the determination of S10 is positive, in S20 corresponding to a function of the engagement pressure controller 80, the predetermined clutch pressure Pc is added to the target engaging device such that the target engaging device is brought into the weak slip state. In S30 corresponding to a function of the state determination unit 78, determination is made whether or not the engine 12 is in the predetermined operational state (for example, the region capable of being locked up by the effect of the weak slip control for the target engaging device). In a case where the determination of S30 is positive, the process returns to the above S20. On the other hand, in a case where the determination of the above S30 is negative, in S40 corresponding to a function of the engagement pressure controller 80, the weak slip control for the executed target engaging device is released.

FIG. 8 illustrates an example of an embodiment of the weak slip control for the target engaging device in a process in which the engine speed Ne is increased from less than the engine speed NeA. In FIG. 8, when the engine speed Ne is increased from less than the engine speed NeA and reaches the engine speed NeA, the weak slip control for the target engaging device starts to add the predetermined clutch pressure Pc for bringing about the weak slip state to the weak slip target engaging device (refer to time point t1). When the engine speed Ne is further increased and reaches the engine speed NeB, the weak slip control for the target engaging device is ended, and the addition of the predetermined clutch pressure Pc for the weak slip target engaging device is released (refer to time point t2).

As mentioned above, according to the present embodiment, in the predetermined operational state, the clutch pressure Pc is added to the target engaging device capable of mutually coupling the rotating member of the loaded part 90 and the rotating member of the non-loaded part 92 that rotate relative to each other such that the target engaging device is brought into the weak slip state within a range that does not affect the selection of the predetermined gear stage. Thus, the drag torque in the target engaging device is increased, the non-loaded part inertia is pressed in the counter-torque direction of the clearance in the rotational direction of the coupling part between the non-loaded part 92 and the loaded part 90 coupled directly therewith, and the non-loaded part inertia is added to the loaded part 90. As mentioned above, the inertia (that is, the loaded part inertia) in the power transmission path in which the torque converter 20 is provided can be increased, the explosive vibration of the engine 12 is easily damped at the time of the engagement of the lock-up clutch LC, and the generation of the muffled sound can be limited. Therefore, it is possible to enlarge the lock-up region to improve the fuel efficiency. In this case, since the target engaging device is in the weak slip state, the gear ratios γ of the automatic transmission 22 vary, or tie-up of the automatic transmission 22 is avoided.

According to the present embodiment, the predetermined operational state is in the predetermined rotational speed region of the engine 12 where the explosive vibration of the engine 12 decreases as the engine speed Ne increases, and the muffled sound accompanying the engagement of the lock-up clutch LC is easily generated. Thus, as the clutch pressure Pc is added to the target engaging device such that the target engaging device is brought into the weak slip state in the predetermined operational state, the lock-up region can be enlarged by the predetermined rotational speed region of the engine 12.

Other embodiments of the present disclosure will be described. In the subsequent description, the parts common to the embodiments will be designated by the same reference signs and the description thereof will be omitted.

In the aforementioned Embodiment 1, the weak slip control for the target engaging device is executed in the predetermined operational state. In this case, there is a possibility that performance degradation, such as degradation of the durability of the target engaging device (specifically, a clutch disk of a friction plate or a counter-friction plate), may be caused.

In the present embodiment, the electronic control unit 70 releases the aforementioned weak slip state in a case where the heat generation amount of the target engaging device brought into the weak slip state becomes equal to or greater than a predetermined heat generation amount.

Specifically, the state determination unit 78 determines whether or not the heat generation amount of the target engaging device brought into the weak slip state becomes equal to or greater than the predetermined heat generation amount. The predetermined heat generation amount is, for example, a lower limit of the heat generation amount that is determined in advance as such a heat generation amount that the heat generation amount of the target engaging device brought into the weak slip state causes the performance degradation. The predetermined heat generation amount is also an allowable value of the heat generation amount of the target engaging device under the weak slip control, which is determined in advance from the viewpoint of not causing the performance degradation of the target engaging device under the weak slip control.

The state determination unit 78 determines that the heat generation amount of the target engaging device becomes equal to or greater than the predetermined heat generation amount, for example, in a case where the target engaging device is brought into the weak slip state for a predetermined time or longer. The predetermined time is, for example, a lower limit of the duration time that is determined in advance as such a time that the duration time for which the weak slip control for the target engaging device is continuously executed makes the heat generation amount of the target engaging device equal to or greater than the predetermined heat generation amount.

The engagement pressure controller 80 releases the aforementioned weak slip control (that is, releases the weak slip state of the target engaging device), in a case where the state determination unit 78 determines that the heat generation amount of the target engaging device becomes equal to or greater than the predetermined heat generation amount, when the weak slip control for the target engaging device is executed.

The lock-up clutch controller 76 releases the engagement of the lock-up clutch LC, in a case where the state determination unit 78 determines that the heat generation amount of the target engaging device becomes equal to or greater than the predetermined heat generation amount, when the lock-up clutch LC is engaged as the target engaging device is brought into the weak slip state in the predetermined operational state. That is, in a case where determination is made that the heat generation amount of the target engaging device becomes equal to or greater than the predetermined heat generation amount, the weak slip state of the target engaging device is released. Thus, the engagement of the lock-up clutch LC is released in accordance with the release of the weak slip state of the target engaging device. The expression "in accordance with the release of the weak slip state of the target engaging device" means substantially simultaneously with the release of the weak slip state of the target engaging device or a little before the weak slip state of the target engaging device is released. Therefore, the determination by the state determination unit 78 in which the heat generation amount of the target engaging device becomes equal to or greater than the predetermined heat generation amount is a determination in which the heat generation amount of the target engaging device has become equal to or greater than the predetermined heat generation amount or a determination in which the heat generation amount of the target engaging device is estimated to become equal to or greater than the predetermined heat generation amount. The expression "releasing the engagement of the lock-up clutch LC" means shifting the lock-up of the lock-up clutch LC to the slip state or a lock-up release state.

In a case where the state determination unit 78 determines that the heat generation amount of the target engaging device becomes equal to or greater than the predetermined heat generation amount when the lock-up clutch LC is engaged as the target engaging device is brought into the weak slip state in the predetermined operational state, the shift controller 74 may execute the shift of the automatic transmission 22 instead of the release of the engagement of the lock-up clutch LC by the lock-up clutch controller 76.

The shift of the automatic transmission 22 herein is, for example, shift to the predetermined gear stage where the generation of the muffled sound is more easily limited as compared to the current gear stage of the automatic transmission 22. The lock-up clutch controller 76 continues the engagement of the lock-up clutch LC, in a case where the shift of the automatic transmission 22 is executed, when the heat generation amount of the target engaging device becomes equal to or greater than the predetermined heat generation amount.

Figure 9:
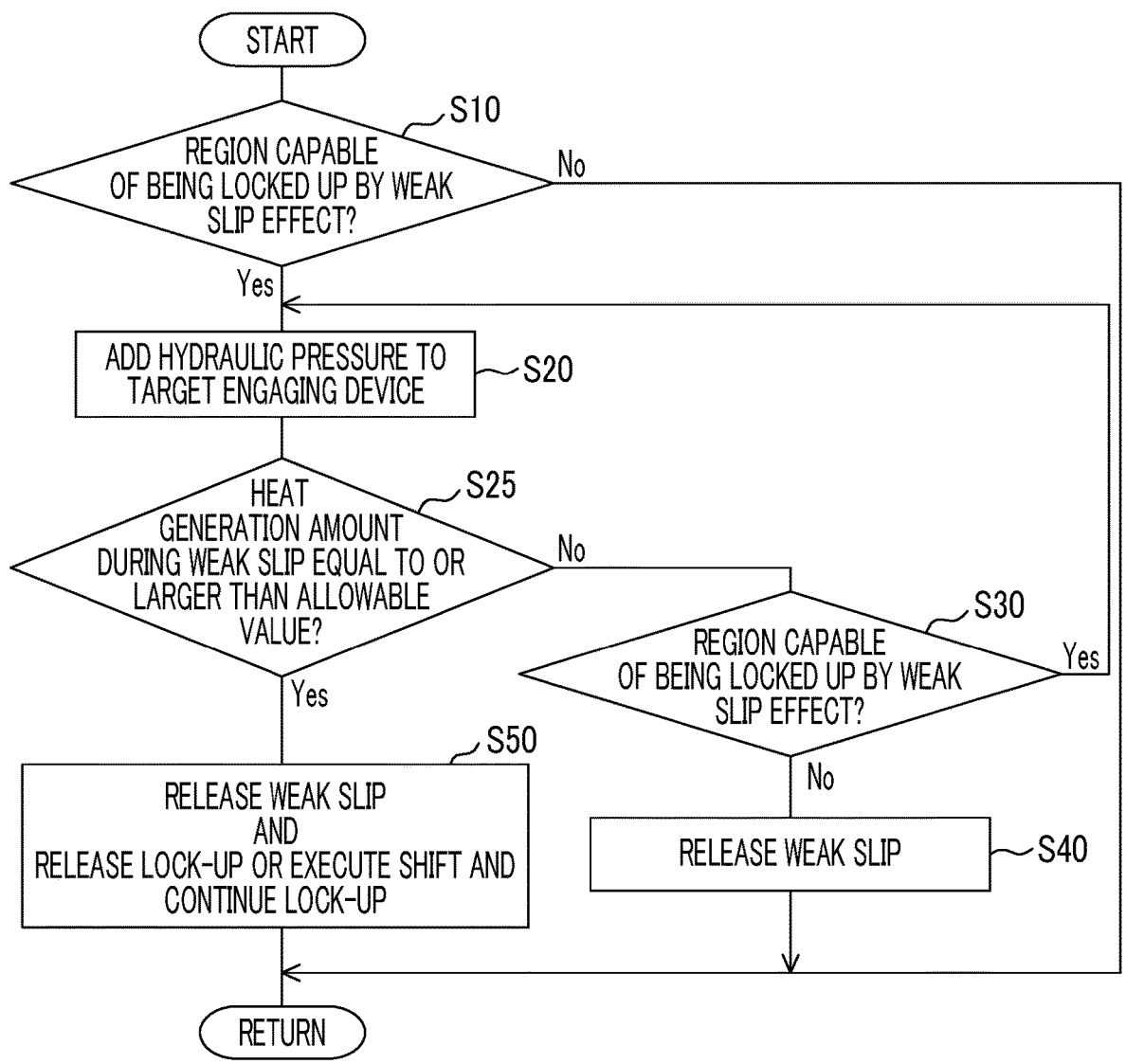
FIG. 9 is a flowchart illustrating the main part of the control operation, that is, extending the lock-up region for the control operation of the electronic control unit to improve fuel efficiency, and illustrating an embodiment different from that of FIG. 7.
Figure 10:
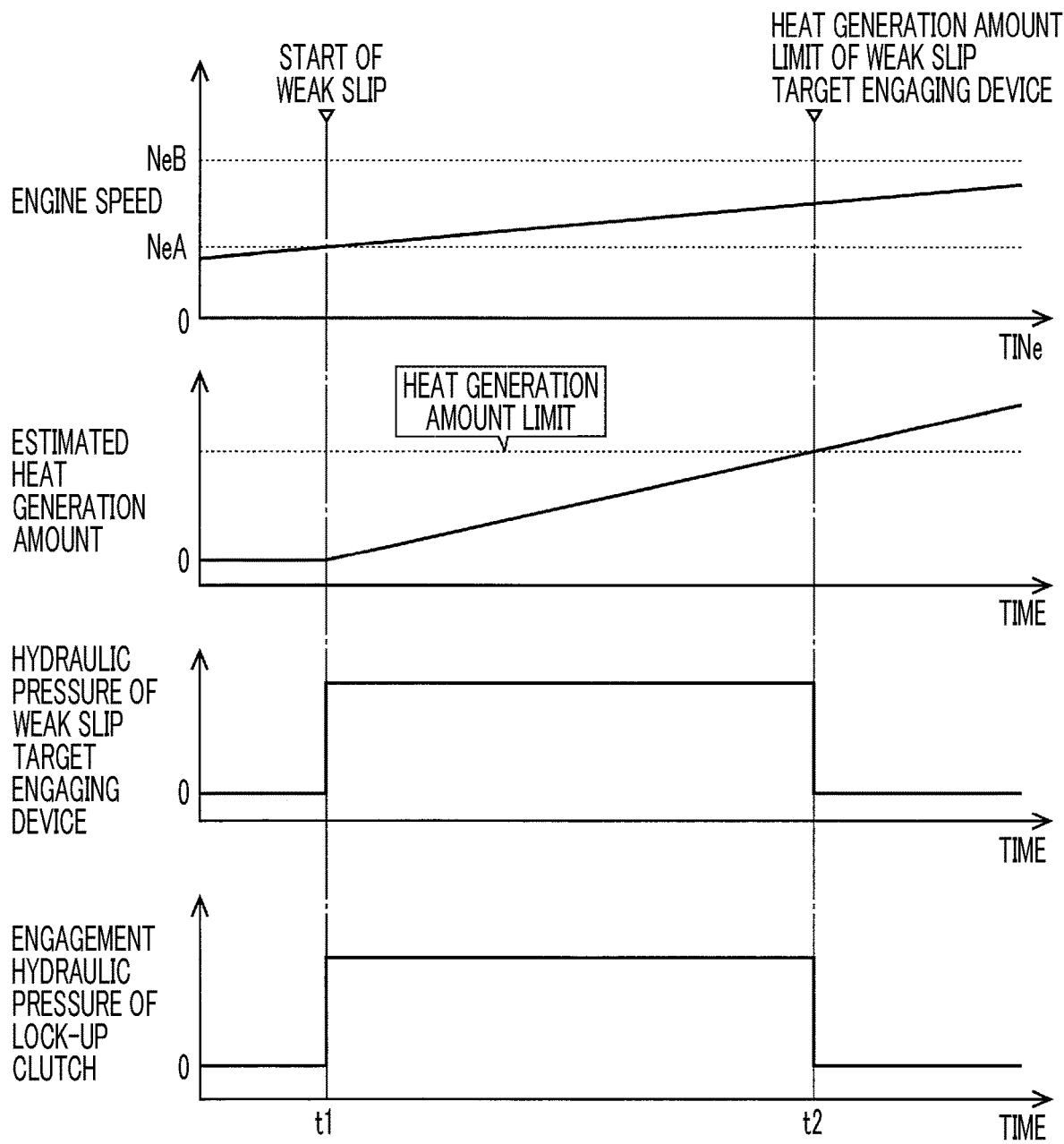
FIG. 10 is a view illustrating an example of a time chart in a case where the control operation illustrated in the flowchart of FIG. 9 is executed, and illustrating an embodiment in a case where engagement of a lock-up clutch is released in accordance with release of a weak slip state of a target engaging device.

FIG. 9 is a flowchart illustrating the main part of the control operation, that is, extending the lock-up region for the control operation of the electronic control unit 70 to improve the fuel efficiency, and for example, the control operation is repeatedly executed. FIG. 10 and FIG. 11 are respectively views illustrating examples of time charts in a case where the control operation illustrated in the flowchart of FIG. 9 is executed.

In FIG. 9, first, in Step S10 corresponding to a function of the state determination unit 78, determination is made whether or not the engine 12 is in the predetermined operational state (for example, the region capable of being locked up by the effect of the weak slip control for the target engaging device). A main routine is ended in a case where the determination of S10 is negative. In a case where the determination of S10 is positive, in S20 corresponding to a function of the engagement pressure controller 80, the predetermined clutch pressure Pc is added to the target engaging device such that the target engaging device is brought into the weak slip state. In Step S25 corresponding to a function of the state determination unit 78, it is determined whether or not the heat generation amount of the target engaging device brought into the weak slip state becomes equal to or greater than the predetermined heat generation amount (allowable value). In a case where the determination of S25 is negative, in S30 corresponding to a function of the state determination unit 78, determination is made whether or not the engine 12 is in the predetermined operational state (for example, the region capable of being locked up by the effect of the weak slip control for the target engaging device). In a case where the determination of S30 is positive, the process returns to the above S20. In a case where the determination of the S30 is negative, in S40 corresponding to a function of the engagement pressure controller 80, the weak slip control for the executed target engaging device is released. On the other hand, in a case where the above determination of S25 is positive, in S50 corresponding to functions of the engagement pressure controller 80 and the lock-up clutch controller 76 (or the shift controller 74), the weak slip control for the executed target engaging device is released, and the lock-up of the lock-up clutch LC is released in accordance with the release of the weak slip control (or the shift of the automatic transmission 22 is executed and the lock-up of the lock-up clutch LC is continued).

FIG. 10 illustrates an example of an embodiment of the weak slip control for the target engaging device in a process in which the engine speed Ne is increased from less than the engine speed NeA, and illustrates a case where the engagement of the lock-up clutch LC is released in accordance with the release of the aforementioned weak slip state. In FIG. 10, when the engine speed Ne is increased from less than the engine speed NeA and reaches the engine speed NeA, the weak slip control for the target engaging device starts to add the predetermined clutch pressure Pc for bringing about the weak slip state to the weak slip target engaging device, and the engagement hydraulic pressure (LC hydraulic pressure) for engaging the lock-up clutch LC is output (refer to time point t1). The heat generation amount of the weak slip target engaging device is increased by the weak slip control (refer to time point t1 and later). Even before the engine speed Ne reaches the engine speed NeB, when the heat generation amount of the aforementioned weak slip target engaging device reaches the predetermined heat generation amount (heat generation amount limit), the weak slip control for the target engaging device is ended, and the addition of the above predetermined clutch pressure Pc to the weak slip target engaging device is released (refer to time point t2). In accordance with the release of the weak slip state of the target engaging device, the output of the above LC hydraulic pressure is stopped and the engagement of the lock-up clutch LC is released.

FIG. 11 illustrates an example of an embodiment of the weak slip control for the target engaging device in a process in which the engine speed Ne is increased from less than the engine speed NeA, and illustrates a case where shift of the automatic transmission 22 is executed in accordance with the release of the aforementioned weak slip state. In FIG. 11, when the fifth speed gear stage "5th" is selected in the automatic transmission 22 and when the engine speed Ne is increased from less than the engine speed NeA and reaches the engine speed NeA, the weak slip control for the target engaging device is started, and the predetermined clutch pressure Pc for bringing about the weak slip state is added to the weak slip target engaging device (refer to time point t1). The heat generation amount of the weak slip target engaging device is increased by the weak slip control (refer to time point t1 and later). Before the heat generation amount of the aforementioned weak slip target engaging device exceeds the predetermined heat generation amount (heat generation amount limit), 5→6 upshift from the fifth speed gear stage "5th" to the sixth speed gear stage "6th" is started in the automatic transmission 22 (refer to time point t2). In the 5→6 upshift, the first clutch C1 is released, and the hydraulic control command signal Sat (shift instruction) for engaging the fourth clutch C4 is output. Thereafter, even before the engine speed Ne reaches the engine speed NeB when the heat generation amount of the aforementioned weak slip target engaging device reaches the predetermined heat generation amount (heat generation amount limit), the weak slip control for the target engaging device is ended, and the addition of the above predetermined clutch pressure Pc to the weak slip target engaging device is released (refer to time point t3). Generally, although it is more advantageous to downshift the automatic transmission 22 to increase the engine speed Ne from the viewpoint of limiting the generation of the muffled sound, an increase in the engine speed Ne, for example, when an accelerator is not operated is likely to give the driver a sense of discomfort. In the automatic transmission 22 of the present embodiment, in the sixth speed gear stage "6th" compared to the fifth speed gear stage "5th", the ratio of the non-loaded part inertia to the loaded part inertia is small, and negative effects resulting from the missing of the non-loaded part inertia to the loaded part 90 does not easily occur (a phenomenon in which the generation of the muffled sound is not easily limited). As mentioned above, 5→6 upshift is executed in the present embodiment.

As mentioned above, according to the present embodiment, the same effects as those of the aforementioned Embodiment 1 are obtained.

According to the present embodiment, the weak slip state is released in a case where the heat generation amount of the target engaging device brought into the weak slip state becomes equal to or greater than the predetermined heat generation amount. Thus, performance degradation, such as degradation of the durability of the target engaging device accompanying an increase in the heat generation amount resulting from being brought into the weak slip state, can be prevented or suppressed, while obtaining the effect of limiting the generation of the muffled sound.

According to the present embodiment, in a case where the target engaging device is brought into the weak slip state for the predetermined time or longer, determination is made that the heat generation amount of the target engaging device becomes more than the predetermined heat generation amount. Thus, an increase in the heat generation amount resulting from the target engaging device being brought into the weak slip state is appropriately determined.

According to the present embodiment, the lock-up clutch LC is engaged when the target engaging device is brought into the weak slip state in the predetermined operational state, and the engagement of the aforementioned lock-up clutch LC is released in a case where the heat generation amount of the target engaging device becomes equal to or greater than the predetermined heat generation amount. Thus, aggravation of the muffled sound accompanying the release of the aforementioned weak slip state can be restrained while preventing or suppressing the performance degradation of the target engaging device resulting from the target engaging device being brought into the weak slip state.

According to the present embodiment, the lock-up clutch LC is engaged when the target engaging device is brought into the weak slip state in the predetermined operational state, shift of the automatic transmission 22 is executed in a case where the heat generation amount of the target engaging device becomes equal to or greater than the predetermined heat generation amount, and the engagement of the lock-up clutch LC is continued in a case where the shift of the automatic transmission 22 is executed. Thus, aggravation of the muffled sound accompanying the release of the weak slip state of the target engaging device or the continuation of the engagement of the lock-up clutch LC due to the shift of the automatic transmission 22 can be prevented or suppressed while preventing or suppressing the performance degradation of the target engaging device resulting from the target engaging device being brought into the weak slip state.

In the aforementioned Embodiments 1 and 2, the weak slip control for the target engaging device is executed in the predetermined operational state. A case where shift of the automatic transmission 22 is needed during the weak slip control is considered. In this case, in a case where a gear stage after the shift of the automatic transmission 22 is selected by the engagement of the target engaging device, there is a possibility that performance degradation, such as degradation of the durability of the target engaging device (specifically, a clutch disk of a friction plate or a counter-friction plate), may be caused. For example, when the target engaging device is made to transit from the weak slip state to engagement, the target engaging device is engaged from a state where the amount of the hydraulic oil on the surface of the clutch disk is extremely small. For that reason, for the clutch disk, high heat generation amount is generated from the state where the amount of the lubricating oil is extremely small. As a result, there is a possibility that the performance degradation may be caused.

In the present embodiment, the electronic control unit 70 does not execute the shift to the gear stage of the automatic transmission 22 that needs to transit from the weak slip state to the engagement in the same engaging device CB. That is, the electronic control unit 70 does not execute the engagement from a state where the amount of the hydraulic oil on the surface of the clutch disk in the engaging device CB is extremely small.

Specifically, the shift controller 74 functionally includes shift prohibition means, that is, a shift prohibition unit 82 that prohibits the shift of the automatic transmission 22 to a gear stage selected by the engagement of the target engaging device, in a case where the shift of the automatic transmission 22 is needed when the target engaging device is brought into the weak slip state. Since the weak slip state and the target engaging device are changed in a case where the shift of the automatic transmission 22 is performed, the engagement pressure controller 80 releases the weak slip control for the target engaging device in a gear stage before the shift.

FIG. 12 is a time chart illustrating an example of an embodiment of the weak slip control for the target engaging device in a process in which the engine speed Ne is increased from less than the engine speed NeA, and is a view illustrating a case where shift of the automatic transmission 22 is needed during the aforementioned weak slip control. In FIG. 12, when the fifth speed gear stage "5th" is selected in the automatic transmission 22 and the engine speed Ne is increased from less than the engine speed NeA and reaches the engine speed NeA, the weak slip control for the target weak slip engaging device (here, the third clutch C3) is started, and the predetermined clutch pressure Pc (weak slip hydraulic pressure) for bringing about the weak slip state is added to the weak slip target engaging device (refer to time point t1). When 5→3 downshift from the fifth speed gear stage "5th" to the third speed gear stage "3th" in which the engagement of the weak slip target engaging device (the third clutch C3) is needed is determined as the accelerator is operated during the weak slip control and the accelerator operation amount θacc is increased, the aforementioned 5→3 downshift is prohibited (refer to a dashed line after time point t2). In this case, in order to realize an increase in the needed drive amount accompanying an increase in the accelerator operation amount θacc as much as possible, the 5→4 downshift from the fifth speed gear stage "5th" to the fourth speed gear stage "4th" is started (refer to time point t2). In the 5→4 downshift, the second clutch C2 is released, and the hydraulic control command signal Sat (shift instruction) for engaging the fourth clutch C4 is output. When the shift instruction is output, even before the engine speed Ne reaches the engine speed NeB, the weak slip control for the target engaging device is ended, and the addition of the predetermined clutch pressure Pc for the weak slip target engaging device is released (refer to time point t2).

As mentioned above, according to the present embodiment, the same effects as those of the aforementioned Embodiment 1 are obtained.

According to the present embodiment, the shift of the automatic transmission 22 to a gear stage selected by the engagement of the target engaging device is prohibited in a case where the shift of the automatic transmission 22 is needed when the target engaging device is brought into the weak slip state. Thus, the heat generation amount is restrained from being increased due to no engagement of the target engaging device of which the heat generation amount is increased by being brought into the weak slip state. As mentioned above, the performance degradation of the target engaging device can be restrained.

Although the embodiments of the present disclosure have been described above in detail with reference to the drawings, an embodiment of the present disclosure is also applied to other aspects.

For example, in FIG. 1 in the aforementioned embodiments, the electronic control unit 70 (shift controller 74) includes the shift prohibition unit 82. However, there is no need for including the shift prohibition unit 82 in aforementioned Embodiment 1 and the aforementioned Embodiment 2.

In the aforementioned embodiments, the fifth speed gear stage "5th" has been exemplified as the predetermined gear stage, and the third clutch C3 has been exemplified as the weak slip target engaging device in the aforementioned fifth speed gear stage "5th". However, an embodiment of the present disclosure is not limited to this aspect. For example, the weak slip target engaging device in the fifth speed gear stage "5th" may be the fourth clutch C4. In this case, the rotating member of the loaded part 90 that makes the relative rotation is the first carrier CA1, and the rotating member of the non-loaded part 92 that makes the relative rotation is the second sun gear S2. Any gear stages of the automatic transmission 22 are applicable as the predetermined gear stage capable of executing the weak slip control. For example, in a case where the predetermined gear stage is the eighth speed gear stage "8th", the weak slip target engaging device in the aforementioned eighth speed gear stage "8th" is the first clutch C1.

In the aforementioned embodiments, the lock-up clutch LC is engaged when the target engaging device is brought into the weak slip state in the predetermined operational state. However, an embodiment of the present disclosure is not limited to this aspect. For example, since a case where the lock-up clutch LC cannot be engaged due to a certain limitation is considered, the engagement of the lock-up clutch LC is not indispensable for the execution of the weak slip control. The weak slip control is performed just by enlarging the lock-up region. Therefore, in a case where the lock-up clutch LC is not engaged during the execution of the weak slip control, for example, in S50 in the flowchart of FIG. 9, release (or shift of the automatic transmission 22 or continuation of the lock-up of the lock-up clutch LC) of the lock-up of the lock-up clutch LC is not performed. As mentioned above, the flowchart of FIG. 9 (the flowchart of FIG. 7 is also the same) can be appropriately changed.

In the aforementioned Embodiment 2, a case where the target engaging device is brought into the weak slip state for a predetermined time or longer has been exemplified as the determination that the heat generation amount of the target engaging device becomes equal to or greater than the predetermined heat generation amount. However, an embodiment of the present disclosure is not limited to this aspect. For example, an estimation value of the heat generation amount of the target engaging device may be calculated, and whether or not the aforementioned estimation value becomes equal to or greater than the predetermined heat generation amount may be determined. The aforementioned estimation value is, for example, a time integration value of a value obtained by multiplying the differential rotational speed in the target engaging device by the clutch pressure Pc at the time of the weak slip control.

In the aforementioned embodiments, in the automatic transmission 22, the respective gear stages of the forward eight stages are selected. However, an embodiment of the present disclosure is not limited to this aspect. The automatic transmission 22 may be a stepped transmission in which one gear stage of the gear stages is selected by any of the engaging devices being selectively engaged.

In the aforementioned embodiment, the engine 12 is exemplified as the power source of the vehicle 10. However, an embodiment of the present disclosure is not limited to this aspect. For example, other prime movers, such as an electric motor, can also be combined with the engine 12 and used as the power source of the vehicle 10. Although the torque converter 20 is exemplified as the hydraulic power transmission device, an embodiment of the present disclosure is not limited to this aspect. For example, instead of the torque converter 20, other hydraulic power transmission devices, such as fluid coupling with no torque amplification action, may be used.

The above description is merely embodiments, and the present disclosure can be implemented in forms to which various changes and improvements are added based on the knowledge of a person skilled in the art, within the scope of the claims.

What is claimed is:

1. A control device for a vehicle including an engine, a hydraulic power transmission device disposed on a power transmission path between the engine and drive wheels, and a stepped transmission disposed on the power transmission path, the hydraulic power transmission device including a lock-up clutch, the stepped transmission being configured such that one gear stage of a plurality of gear stages is selected by any of a plurality of engaging devices being selectively engaged, the control device comprising:

an electronic control unit including circuitry, the electronic control unit configured to:

control release of a predetermined engaging device configured to selectively engage a rotating member of a loaded part that participates in power transmission in a predetermined gear stage with a rotating member of a non-loaded part that does not participate in the power transmission in the predetermined gear stage, among the engaging devices, at a time of selection of the predetermined gear stage of the stepped transmission, and control the predetermined engaging device such that an engagement pressure for bringing the predetermined engaging device into a weak slip state in a range that does not affect the selection of the predetermined gear stage is added to the predetermined engaging device, at the time of the selection of the predetermined gear stage and in a predetermined operational state, wherein the engagement pressure for bringing the predetermined engaging device into the weak slip state is lower than an engagement pressure under which the predetermined engagement device is one of half-engaged and engaged.

2. The control device according to claim 1, wherein the predetermined operational state is in a predetermined rotational speed region of the engine where vibration of the engine decreases as an engine speed of the engine increases, and sound accompanying engagement of the lock-up clutch is generated.

3. The control device according to claim 1, wherein:

the electronic control unit is configured to determine whether or not a heat generation amount of the predetermined engaging device brought into the weak slip state becomes equal to or greater than a predetermined heat generation amount; and the electronic control unit is configured to control the predetermined engaging device such that the weak slip state is released, in a case where the heat generation amount of the predetermined engaging device becomes equal to or greater than the predetermined heat generation amount.

4. The control device according to claim 3, wherein the electronic control unit is configured to determine that the heat generation amount of the predetermined engaging device becomes equal to or greater than the predetermined heat generation amount, in a case where the predetermined engaging device is brought into the weak slip state for a predetermined time or longer.

5. The control device according to claim 3, wherein:

the electronic control unit is configured to control engaging of the lock-up clutch when the predetermined engaging device is brought into the weak slip state in the predetermined operational state; and the electronic control unit is configured to control release of the engagement of the lock-up clutch, in a case where the heat generation amount of the predetermined engaging device becomes equal to or greater than the predetermined heat generation amount.

6. The control device according to claim 3, wherein:

the electronic control unit is configured to control engaging of the lock-up clutch when the predetermined engaging device is brought into the weak slip state in the predetermined operational state;

the electronic control unit is configured to execute a shift of the stepped transmission, in a case where the heat generation amount of the predetermined engaging device becomes equal to or greater than the predetermined heat generation amount; and the electronic control unit is configured to control the continuation of the engagement of the lock-up clutch, in a case where the shift of the stepped transmission is executed when the heat generation amount of the predetermined engaging device becomes equal to or greater than the predetermined heat generation amount.

7. The control device according to claim 1, wherein the electronic control unit is configured to prohibit a shift of the stepped transmission to a gear stage selected by the engagement of the predetermined engaging device, in a case where the shift of the stepped transmission is needed when the predetermined engaging device is brought into the weak slip state.

* * * * *